US012220629B2

(12) United States Patent
Suzuki et al.

(10) Patent No.: US 12,220,629 B2
(45) Date of Patent: Feb. 11, 2025

(54) OPERATION DEVICE AND OPERATION SYSTEM

(71) Applicant: Sony Interactive Entertainment Inc., Tokyo (JP)

(72) Inventors: Kentarou Suzuki, Tokyo (JP); Tsubasa Umeki, Tokyo (JP); Tomohiro Oto, Tokyo (JP); Shinpei Kameoka, Tokyo (JP); Kazuteru Fukayama, Tokyo (JP); Ryu Sannomiya, Tokyo (JP); Yusuke Onishi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 101 days.

(21) Appl. No.: 17/912,934

(22) PCT Filed: Apr. 7, 2020

(86) PCT No.: PCT/JP2020/015740
§ 371 (c)(1),
(2) Date: Sep. 20, 2022

(87) PCT Pub. No.: WO2021/205553
PCT Pub. Date: Oct. 14, 2021

(65) Prior Publication Data
US 2023/0144784 A1 May 11, 2023

(51) Int. Cl.
*A63F 13/40* (2014.01)
*A63F 13/90* (2014.01)
*A63F 13/92* (2014.01)

(52) U.S. Cl.
CPC .............. *A63F 13/40* (2014.09); *A63F 13/90* (2014.09); *A63F 13/92* (2014.09);
(Continued)

(58) Field of Classification Search
CPC .......... A63F 13/21; A63F 13/24; A63F 13/40; A63F 13/90; A63F 13/92;
(Continued)

(56) References Cited

U.S. PATENT DOCUMENTS

| 5,838,138 A | * | 11/1998 | Henty | G06F 3/0338 |
| | | | | 320/135 |
| 5,844,516 A | * | 12/1998 | Viljanen | G08C 17/02 |
| | | | | 341/173 |

(Continued)

FOREIGN PATENT DOCUMENTS

| CN | 2409705 Y | * | 12/2000 |
| CN | 1728061 A | * | 2/2006 |

(Continued)

OTHER PUBLICATIONS

English translation of JP2008177948A (Year: 2008).*
(Continued)

*Primary Examiner* — Steven J Hylinski
(74) *Attorney, Agent, or Firm* — Kilpatrick Townsend & Stockton LLP

(57) ABSTRACT

An operation device includes an operation unit, a power generation element that generates power according to an operation of the operation unit, a battery that supplies power, and a communication unit that transmits an operation signal corresponding to the operation unit that has been operated. The communication unit transmits the operation signal by use of power supplied from the battery, in a case where a residual quantity of the battery is a predetermined residual quantity or larger. The communication unit transmits the operation signal by use of power generated by the power generation element, in a case where the residual quantity of the battery is smaller than the predetermined residual quantity.

16 Claims, 15 Drawing Sheets

(52) U.S. Cl.
CPC ... *A63F 2300/1043* (2013.01); *A63F 2300/20* (2013.01); *A63F 2300/204* (2013.01); *A63F 2300/302* (2013.01); *G08C 2201/11* (2013.01); *G08C 2201/112* (2013.01)

(58) Field of Classification Search
CPC .......... A63F 2300/1043; A63F 2300/20; A63F 2300/204; A63F 2300/302
See application file for complete search history.

(56) References Cited

U.S. PATENT DOCUMENTS

| | | | |
|---|---|---|---|
| 8,860,558 B2 | 10/2014 | Katayama | |
| 9,551,327 B2* | 1/2017 | Kaneko | G06F 3/0202 |
| 9,934,678 B2* | 4/2018 | Hirakawa | G08C 17/02 |
| 2002/0190610 A1* | 12/2002 | Andre | G08C 17/02 |
| | | | 310/339 |
| 2003/0137274 A1* | 7/2003 | Sastry | H02J 7/32 |
| | | | 320/101 |
| 2004/0137961 A1* | 7/2004 | Tu | H02K 7/1853 |
| | | | 455/572 |
| 2004/0174287 A1* | 9/2004 | Deak | G08C 17/02 |
| | | | 341/173 |
| 2012/0169483 A1 | 7/2012 | Katayama | |
| 2013/0187878 A1 | 7/2013 | Muikaichi | |
| 2013/0281212 A1 | 10/2013 | Tsuchiya | |
| 2016/0110995 A1 | 4/2016 | Hirakawa | |
| 2019/0054372 A1* | 2/2019 | Morgan | A63F 13/24 |
| 2021/0132709 A1* | 5/2021 | Tatani | B43K 29/08 |

FOREIGN PATENT DOCUMENTS

| | | | |
|---|---|---|---|
| CN | 202533869 U | * | 11/2012 |
| CN | 102830820 A | * | 12/2012 |
| CN | 205158309 U | * | 4/2016 |
| CN | 111403213 A | * | 7/2020 |
| JP | H04370615 A | * | 12/1992 |
| JP | H0566742 U | * | 9/1993 |
| JP | H05276680 A | * | 10/1993 |
| JP | H0668911 A | * | 3/1994 |
| JP | H1055229 A | * | 2/1998 |
| JP | 2005323285 A | | 11/2005 |
| JP | 2008177948 A | | 7/2008 |
| JP | 2009199961 A | * | 9/2009 |
| JP | 2011056135 A | | 3/2011 |
| JP | 2013187688 A | | 6/2013 |
| JP | 2013156980 A | | 8/2013 |
| JP | 2013236909 A | | 11/2013 |
| JP | 2014068115 A | * | 4/2014 |
| JP | 2015179562 A | | 10/2015 |
| JP | 2018029450 A | | 2/2018 |
| JP | 2003224315 A | | 8/2023 |
| KR | 20100015782 A | * | 2/2010 |
| WO | WO-2011058602 A1 | * | 5/2011 .......... H01L 41/1138 |

OTHER PUBLICATIONS

English translation of JP2013236909A (Year: 2013).*
English translation of JP2014068115A (Year: 2014).*
English translation (Year: 2008).*
English translation (Year: 2013).*
English translation (Year: 2014).*
International Search Report for corresponding PCT Application No. PCT/JP2020/015740, 4 pages, dated Jul. 21, 2020.
Notice of Reasons for Refusal for corresponding JP Application No. 2022-513755, 14 pages, dated Oct. 4, 2023.

* cited by examiner

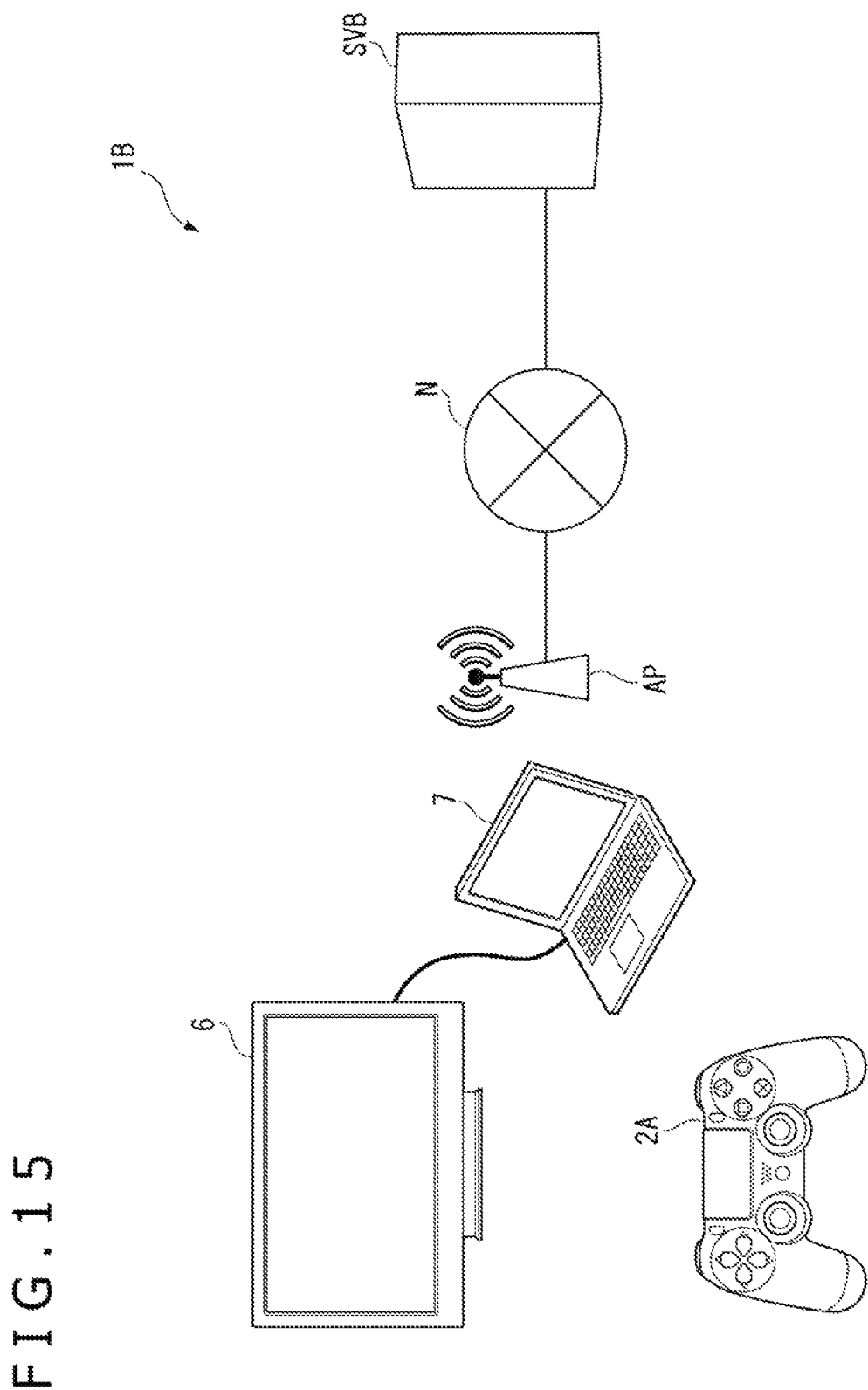

OPERATION DEVICE AND OPERATION SYSTEM

TECHNICAL FIELD

The present disclosure relates to an operation device and an operation system.

BACKGROUND ART

There is known a conventional remote controller which has an operation unit including a plurality of buttons, a power generation unit, a power source management unit, a control unit, a storage unit, a switch, a wireless transmission unit, and an antenna (e.g., see PTL 1).

According to a remote controller described in PTL 1, a power generation unit has a plurality of power generation elements each generating power by use of energy generated in response to a press of a corresponding button. Note that examples of the power generation elements employed to constitute the power generation unit include power generation elements each generating power by a temporal change in magnetic flux using a spring, a permanent magnet, and an induction coil, and power generation elements each constituted by a piezoelectric element, a magnetostrictive material, a giant magnetostrictive material, or the like, and generating power by elastic deformation in response to a press of a button.

Each of the power source management unit, the control unit, and the storage unit operates by use of power generated by the power generation unit.

The power source management unit has a power accumulation element which accumulates power supplied from the power generation unit. The power source management unit is capable of outputting, to the control unit, an operation signal of a type associated with contents of a corresponding one of operations performed for the operation unit.

The control unit outputs contents of the operation signal received from the power source management unit to the storage unit. The control unit analyzes the operation signal received from the power source management unit and transmits information corresponding to the contents of the operation signal stored in the storage unit, such as a wireless signal containing contents themselves of the operation signal, by controlling the switch and the wireless transmission unit when the operation performed for the operation unit meets a predetermined condition.

The wireless transmission unit operates using power supplied from the power accumulation element via the switch turned on by the control unit, generates a wireless signal containing the information received from the control unit, and transmits the generated wireless signal to a receiver via the antenna. Note that the switch is turned off after the wireless transmission unit transmits the operation signal.

CITATION LIST

Patent Literature

[PTL 1] US/2016/110995

SUMMARY

Technical Problem

According to the remote controller described in PTL 1, each of the power source management unit, the control unit, the storage unit, and the wireless transmission unit operates using power generated in response to a press of the button. Accordingly, a period from the time of the press of the button to the time of transmission of the operation signal tends to increase. In other words, according to the remote controller described in PTL 1, a transmission delay of the operation signal from the press of the button is likely to be produced, regardless of an intention of the user or the like. From this viewpoint, the controller described above is considered to have a problem of low usability.

The present disclosure aims at solution of at least a part of the problems described above. One of objects to be achieved by the present disclosure is to provide an operation device and an operation system capable of improving usability.

Solution to Problem

An operation device according to a first aspect of the present disclosure includes an operation unit, a power generation element that generates power according to an operation of the operation unit, a battery that supplies power, and a communication unit that transmits an operation signal corresponding to the operation unit that has been operated, and the communication unit transmits the operation signal by use of power supplied from the battery, in a case where a residual quantity of the battery is a predetermined residual quantity or larger, and the communication unit transmits the operation signal by use of power generated by the power generation element, in a case where the residual quantity of the battery is smaller than the predetermined residual quantity.

An operation device according to a second aspect of the present disclosure includes an operation unit, a power generation element that generates power according to an operation of the operation unit, a battery that supplies power, a switching unit that switches an operation mode according to an operation performed by a user, and a communication unit that transmits an operation signal corresponding to the operation unit that has been operated. The communication unit transmits the operation signal by use of power accumulated in the battery, in a case where the operation mode is a first mode, and the communication unit transmits the operation signal by use of power generated by the power generation element, in a case where the operation mode is a second mode.

An operation device according to a third aspect of the present disclosure includes an operation unit, a power generation element that generates power according to an operation of the operation unit, a battery that supplies power, a power reception unit that receives power externally supplied, and a communication unit that transmits an operation signal corresponding to the operation unit that has been operated. In a case where power received by the power reception unit has a predetermined value or higher, the communication unit transmits the operation signal by use of the power supplied from the battery charged by power received by the power reception unit, and in a case where the power received by the power reception unit has a value lower than the predetermined value, the communication unit transmits the operation signal by use of the power generated by the power generation element.

An operation system according to a fourth aspect of the present disclosure includes an operation device that transmits an operation signal, and an electronic device that receives the operation signal and operates. The operation device includes an operation unit, a power generation element that generates power according to an operation of the operation unit, a battery that supplies power, and a transmission unit that transmits the operation signal corresponding to the operation unit that has been operated. The operation device operates in either one of a first mode where the transmission unit transmits the operation signal by use of power supplied from the battery and a second mode where the transmission unit transmits the operation signal by use of power generated by the power generation element. The operation signal contains information indicating an operation mode of the operation device. The electronic device includes a reception unit that receives the operation signal from the operation device, a mode determination unit that determines the operation mode of the operation device on the basis of the operation signal received by the reception unit, and a notification unit that gives a notification indicating the operation mode of the operation device, when the mode determination unit determines that the operation mode of the operation device has been switched from the first mode to the second mode.

An operation system according to a fifth aspect of the present disclosure includes an operation device that transmits an operation signal, an information processing device that receives the operation signal, and a server that communicates with the information processing device. The operation device includes an operation unit, a power generation element that generates power according to an operation of the operation unit, a battery that supplies power, and a transmission unit that transmits the operation signal corresponding to the operation unit that has been operated. The operation device operates in either one of a first mode where the transmission unit transmits the operation signal by use of power supplied from the battery and a second mode where the transmission unit transmits the operation signal by use of power generated by the power generation element. The operation signal contains information indicating an operation mode of the operation device. The information processing device transmits the operation signal received from the operation device to the server and receives a processing result obtained by the server from the server. The server includes a mode determination unit that determines the operation mode of the operation device on the basis of the operation signal received from the information processing device, and a notification unit that transmits, to the information processing device, the processing result to be given by the information processing device as a notification indicating the operation mode of the operation device, when the mode determination unit determines that the operation mode of the operation device has been switched from the first mode to the second mode.

The operation devices according to the first to third aspects described above, and the operation systems according to the fourth and fifth aspects described above are operation devices and operation systems capable of improving usability.

BRIEF DESCRIPTION OF DRAWINGS

FIG. 15 is a schematic diagram depicting a configuration of a game system according to a fourth embodiment.

DESCRIPTION OF EMBODIMENTS

[First embodiment] A first embodiment of the present disclosure will hereinafter be described with reference to the drawings.

Figure 1:
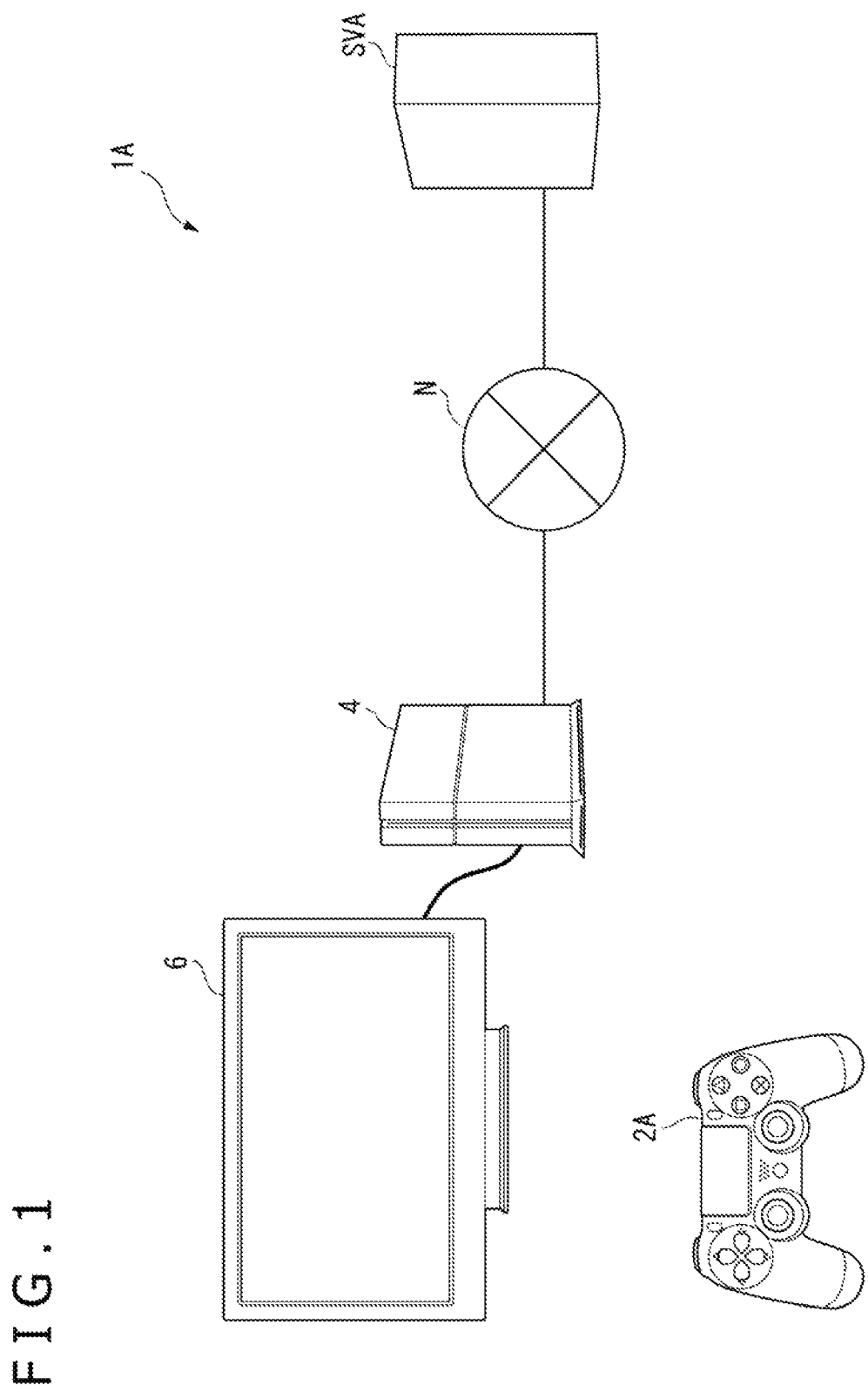
FIG. 1 is a schematic diagram depicting a configuration of a game system according to a first embodiment.

FIG. 1 is a schematic diagram depicting a configuration of a game system 1A according to the present embodiment.

The game system 1A according to the present embodiment corresponds to an operation system. As depicted in FIG. 1, the game system 1A includes an operation device 2A, a game device 4, and a display device 6. The game system 1A is configured such that the game device 4 advances a game, and that the display device 6 displays a screen during execution of the game device 4, such as a game screen, according to operation signals transmitted from the operation device 2A.

Respective configurations of the game system 1A will hereinafter be described.

Figure 2:
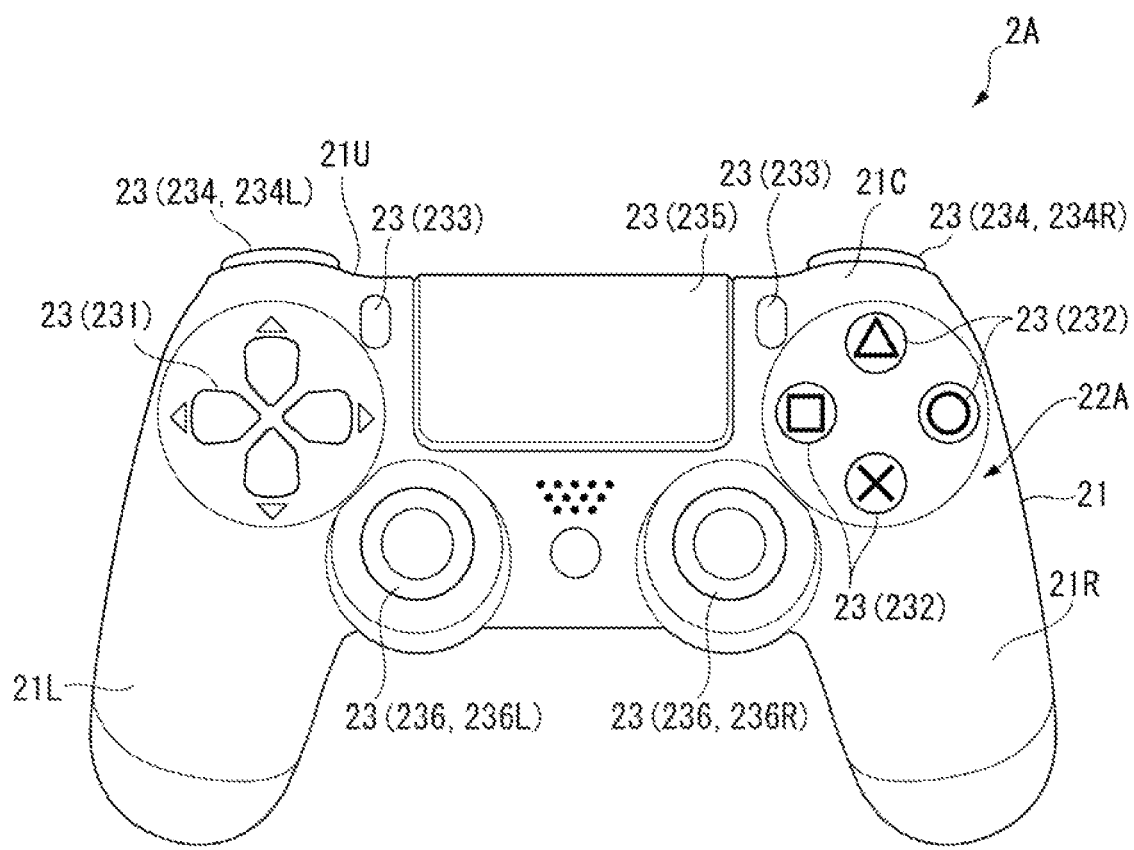
FIG. 2 is a diagram depicting an external appearance of an operation device according to the first embodiment.

[Configuration of Operation Device] FIG. 2 is a diagram depicting an external appearance of the operation device 2A. Specifically, FIG. 2 is a front diagram depicting the operation device 2A.

The operation device 2A transmits an operation signal corresponding to an input operation input by a user to operate the game device 4. For example, as depicted in FIG. 2, the operation device 2A can constitute a control pad (controller) having an inverted U-shape as viewed from the front. The operation device 2A depicted in FIG. 2 by way of example has a housing 21.

[Configuration of Housing] The housing 21 has a left holding portion 21L, a right holding portion 21R, a central portion 21C, and a top portion 21U.

The left holding portion 21L is located at a left end portion of the housing 21 and held by the left hand of the user. The right holding portion 21R is located at a right end portion of the housing 21 and held by the right hand of the user.

The central portion 21C is provided between the left holding portion 21L and the right holding portion 21R.

The top portion 21U is a surface located on the upper side as viewed from the user facing the central portion 21C while holding the left holding portion 21L by the left hand and the right holding portion 21R by the right hand.

[Configuration of Device Body] The operation device 2A includes a device body 22A provided on the housing 21. The device body 22A has an operation unit 23 exposed to the outside of the housing 21.

[Configuration of Operation Unit] The operation unit 23 includes one direction button 231, four buttons 232, two buttons 233, and four buttons 234 (234L and 234R), and further a touch pad 235, and two sticks 236 (236L and 236R). Each of the buttons 231 to 234 corresponds to an operator.

The direction button 231 is a button pressable in the up-down and left-right directions. The direction button 231 is disposed on the left holding portion 21L.

The four buttons 232 are disposed on the right holding portion 21R.

The two buttons 233 are provided on the left and right of the central portion 21C, respectively.

The two buttons 234L included in the four buttons 234 and provided at the left end of the top portion 21U (the operation button on the depth side is not depicted in the figure) are disposed in a line in the depth direction. Similarly, the two buttons 234R included in the four buttons 234 and provided at the right end of the top portion 21U (the operation button on the depth side is not depicted in the figure) are disposed in a line in the depth direction.

The touch pad 235 is a two-point detection type touch pad. The touch pad 235 detects a touch operation performed by the user, and outputs a signal corresponding to the detected touch operation. The touch pad 235 is provided in the central portion 21C at a position sandwiched between the two buttons 233 in such a manner as to be able to be inserted and protruded into the housing 21. Accordingly, the touch pad 235 is one operator included in the operators.

The stick 236L included in the two sticks 236 is disposed below and on the left of the touch pad 235, while the stick 235R is disposed on the lower side and the right side of the touch pad 235. While not depicted in detail in the figure, each of the sticks 236L and 236R has a tiltable shaft member. Each of the sticks 236L and 236R detects a tilt direction of the shaft member tilted by the user, and outputs a signal indicating the detected tilt direction.

Figure 3:
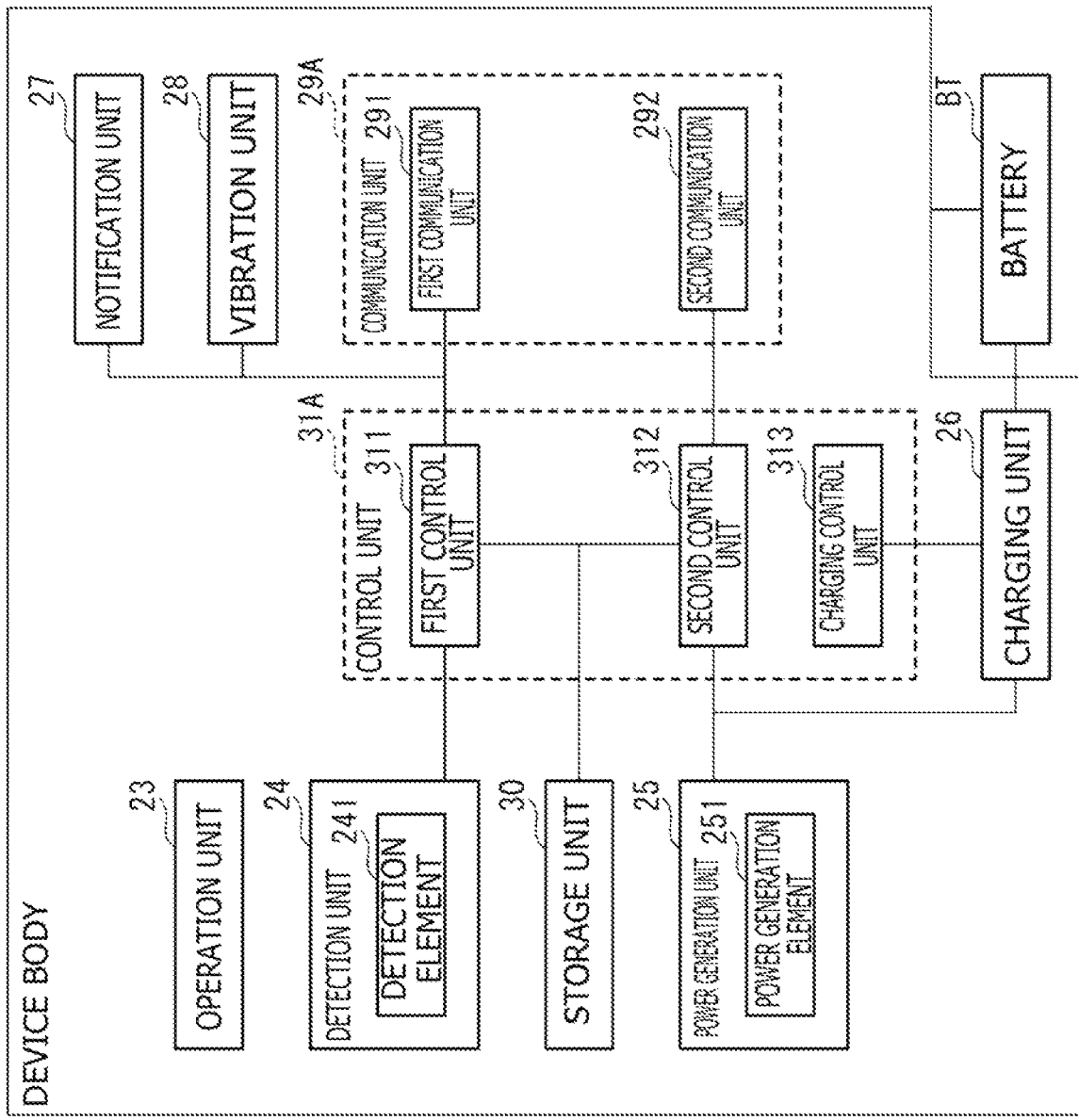
FIG. 3 is a block diagram depicting a configuration of a device body of the operation device according to the first embodiment.

[Other Configurations of Device Body] FIG. 3 is a block diagram depicting a configuration of the device body 22A.

As depicted in FIG. 3, the device body 22A includes, in addition to the operation unit 23, a battery BT, a detection unit 24, a power generation unit 25, a charging unit 26, a notification unit 27, a vibration unit 28, a communication unit 29A, a storage unit 30, and a control unit 31A.

Note that the operation device 2A operates in a first mode which uses power supplied from the battery BT, in a case where a residual quantity of the battery BT is a predetermined residual quantity or larger. The first mode can also be referred to as a battery power use mode. Note that the predetermined residual quantity can be defined as such a residual quantity sufficient for transmission of an operation signal from the operation device 2A, for example.

On the other hand, in a case where the residual quantity of the battery BT is smaller than the predetermined residual quantity, the operation device 2A operates in a second mode which uses power supplied from the power generation unit 25. The second mode can also be referred to as a generated power use mode.

As described above, the operation device 2A has operation modes including the first mode and the second mode.

[Configuration of Battery] The battery BT supplies accumulated power to the device body 22A. According to the present embodiment, the battery BT is constituted by a secondary battery chargeable by the charging unit 26 described below. However, the battery BT may be constituted by a primary battery instead of this example. In addition, the battery BT may be provided in such a manner as to be attachable to and detachable from the housing 21.

[Configuration of Detection Unit] The detection unit 24 operates using power supplied from the battery BT to detect a press of the corresponding one of the buttons. In other words, the detection unit 24 operates when the operation mode of the operation device 2A is the first mode.

The detection unit 24 includes a plurality of detection elements 241 provided in correspondence with the buttons 231 to 234 and the touch pad 235 which are detection targets constituting the operation unit 23. Each of the plurality of detection elements 241 detects a press of the corresponding detection target of the buttons 231 to 234 and the touch pad 235. The detection element 241 having detected the press of the detection target outputs a signal containing identification information indicating the detection element 241 itself to a first control unit 311 included in the control unit 31A and described below.

[Configuration of Power Generation Unit] The power generation unit 25 includes a plurality of power generation elements 251 disposed within the housing 21 in correspondence with the detection targets of the respective detection elements 241. Specifically, the plurality of power generation elements 251 are provided within the housing 21 in correspondence with the buttons 231 to 234 and the touch pad 235, which are detection targets provided in such a manner as to be able to be inserted and protruded into the housing 21.

Each of the power generation elements 251 generates power in response to a press of the corresponding detection target and supplies the generated power to the charging unit 26 and a second control unit 312 included in the control unit 31A and described below. Moreover, in a case where any of the detection targets is pressed, the corresponding power generation element 251 outputs a signal containing identification information indicating the pressed detection target to the second control unit 312. In other words, supply of power from any one of the power generation elements 251 indicates a press of the detection target associated with the corresponding power generation element 251.

[Configuration of Charging Unit] The charging unit 26 charges the battery BT with power supplied from the power generation elements 251.

Here, at least a part of power generated by the power generation elements 251 is consumed for transmission of operation signals by using the second control unit 312 and a second communication unit 292 included in a communication unit 29A and described below. Accordingly, the power used for charging the battery BT by the charging unit 26 corresponds to surplus power in the power generated by the power generation elements 251.

Note that the charging unit 26 may be eliminated in a case where no surplus power remains in the generated power, for example.

[Configuration of Notification Unit] The notification unit 27 gives a notification of an operation state of the operation device 2A. In other words, the notification unit 27 is a first notification unit which gives a notification of the operation state of the operation device 2A by presenting a lighting state. Specifically, the notification unit 27 lights with power supplied from the battery BT when an input operation is performed for the operation unit 23 under control by the first control unit 311.

In more detail, in a case where the residual quantity of the battery BT is the predetermined residual quantity or larger, i.e., in a case where the operation mode of the operation device 2A is the first mode, the notification unit 27 lights in response to at least an input operation performed for the operation unit 23 under control by the first control unit 311.

On the other hand, in a case where the residual quantity of the battery BT is smaller than the predetermined residual quantity, i.e., in a case where the operation mode of the operation device 2A is the second mode, no power is supplied to the notification unit 27. Accordingly, the notification unit 27 does not light even when an input operation is performed for the operation unit 23.

The user can check which of the first mode and the second mode has been selected as the operation mode of the operation device 2A on the basis of the lighting state of the notification unit 27 configured as above.

Note that the notification unit 27 may be configured to light in a first color with use of power supplied from the battery BT, in a case where the residual quantity of the battery BT is the predetermined residual quantity or larger, and light in a second color different from the first color with use of power supplied from the power generation elements 251, in a case where the residual quantity of the battery BT is smaller than the predetermined residual quantity. In other words, the notification unit 27 may be configured to light in the first color with use of power of the battery BT, in a case where the operation mode of the operation device 2A is the first mode, and light in the second color with use of power of the power generation elements 251, in a case where the operation mode of the operation device 2A is the second mode.

Moreover, in a case where the residual quantity of the battery BT is the predetermined residual quantity or larger, the notification unit 27 may constantly light as long as the power source of the operation device 2A is kept turned on.

The notification 27 thus configured may be constituted by an indicator including a solid state light source such as an LED (Light Emitting Diode). However, the notification unit 27 is not limited to the unit of this example, but may be a unit which outputs sound corresponding to an input operation performed for the operation unit 23, in a case where the residual quantity of the battery BT is the predetermined residual quantity or larger, and does not output sound, in a case where the residual quantity of the battery BT is smaller than the predetermined residual quantity even when an input operation is input to the operation unit 23.

[Configuration of Vibration Unit] The vibration unit 28 is a unit which generates vibration, and may be constituted by a motor, for example.

The vibration unit 28 generates vibration in a case where the operation unit 23 is operated. In this manner, the user is notified of the fact that the operation unit 23 has been operated. Accordingly, the vibration unit 28 can be considered as a second notification unit which gives a notification of an operation state of the operation device 2A. According to the present embodiment, the vibration unit 28 vibrates with use of power supplied from the battery BT under control by the first control unit 311, in a case where the operation mode of the operation device 2A is the first mode. However, the vibration unit 28 is not limited to the unit of this example but may be a unit configured to vibrate with use of power supplied from the power generation elements 251 under control by the second control unit 312, in a case where the operation mode of the operation device 2A is the second mode.

Moreover, in a case where the communication unit 29A receives a vibration generation signal, which is a signal for generating vibration, from the game device 4, the vibration unit 28 generates vibration under control by the first control unit 311 or the second control unit 312.

Note that the vibration unit 28 is not an essential constituent element.

[Configuration of Communication Unit] The communication unit 29A corresponds to a transmission unit which transmits an operation signal to the game device 4 under control by the control unit 31A, as an operation signal corresponding to an input operation performed by the user for the operation unit 23. The communication unit 29A includes a first communication unit 291 and the second communication unit 292.

Each of the first communication unit 291 and the second communication unit 292 wirelessly transmits an operation signal in conformity with near field wireless communication standards such as Bluetooth (registered trademark). However, each of the first communication unit 291 and the second communication unit 292 may be configured to wirelessly transmit an operation signal in conformity with other wireless communication standards such as ZigBee (registered trademark).

The first communication unit 291 transmits an operation signal input from the first control unit 311 by using power supplied from the battery BT. The operation signal transmitted by the first communication unit 291 contains information indicating that the operation mode of the operation device 2A is the first mode. For example, the operation signal transmitted by the first communication unit 291 contains information indicating that the operation signal is an operation signal transmitted by the first communication unit 291.

The second communication unit 292 transmits an operation signal input from the second control unit 312 by using power supplied from the power generation elements 251. The operation signal transmitted by the second communication unit 292 contains information indicating that the operation mode of the operation device 2A is the second mode. For example, the operation signal transmitted by the second communication unit 292 contains information indicating that the operation signal is an operation signal transmitted by the second communication unit 292.

[Configuration of Storage Unit] The storage unit 30 stores various types of data necessary for performing operations of the operation device 2A. For example, the storage unit 30 stores a correspondence between the detection targets described above and respective pieces of identification information indicating the detection targets.

[Configuration of Control Unit] The control unit 31A controls operations of the operation device 2A. For example, the control unit 31A controls the charging unit 26, the notification unit 27, the vibration unit 28, the communication unit 29A, and the storage unit 30. The control unit 31A includes the first control unit 311, the second control unit 312, and a charging control 313.

[Configuration of First Control Unit] The first control unit 311 operates with power supplied from the battery BT to control the operation device 2A, in a case where the residual quantity of the battery BT is the predetermined residual quantity or larger, i.e., in a case where the operation device 2A operates in the first mode. Specifically, the first control unit 311 controls the notification unit 27, the vibration unit 28, and the first communication unit 291.

For example, when the operation unit 23 is operated, the first control unit 311 causes the notification 27 to give a notification that the operation unit 23 has been operated. Specifically, when a signal is input from any one of the detection elements 241, the touch pad 235, and the sticks 236, the first control unit 311 causes the notification unit 27 to give a notification that the operation unit 23 has been operated.

Moreover, for example, the first control unit 311 causes the first communication unit 291 to transmit an operation signal corresponding to an input operation performed by the user for the operation unit 23. Specifically, in a case where a signal is input from any one of the detection elements 241 in response to a press of the corresponding detection target, the first control unit 311 specifies the detection target corresponding to identification information contained in the input signal with reference to the storage unit 30, and causes the first communication unit 291 to transmit an operation signal indicating that the specified detection target has been operated.

Moreover, when a signal is input from any one of the touch pad 235 and the sticks 236, the first control unit 311 causes the first communication unit 291 to transmit an operation signal corresponding to the input signal.

Note that the first control unit 311 regulates transmission of an operation signal from the second control unit 312 to the second communication unit 292 in a case where the first control unit 311 causes the first communication unit 291 to transmit an operation signal. For example, the first control unit 311 causes the first communication unit 291 to transmit an operation signal, and outputs a regulation signal to the second control unit 312 to regulate transmission of an operation signal from the second communication unit 292. Accordingly, the first control unit 311 has a function of a transmission regulation unit.

In addition, the first control unit 311 specifies the residual quantity of the battery BT on the basis of power (particularly voltage) supplied from the battery BT and causes the first communication unit 291 to transmit a residual quantity notification signal for notification of the residual quantity of the battery BT at timing immediately before the residual quantity of the battery BT becomes smaller than the predetermined residual quantity. In this manner, the game device 4 is allowed to recognize a state that the operation mode of the operation device 2A will be switched from the first mode to the second mode in a short time due to a small residual quantity of the battery BT.

Note that the first control unit 311 may periodically causes the first communication unit 291 to transmit the residual quantity notification signal.

[Configuration of Second Control Unit] The second control unit 312 is started by power supplied from the power generation elements 251 to control the operation device 2A, in a case where the residual quantity of the battery BT is smaller than the predetermined residual quantity, i.e., in a case where the operation device 2A operates in the second mode. The second control unit 312 controls the second communication unit 292, for example.

In a case where a signal is input from the corresponding power generation element 251 in response to a press of at least one of the detection targets, the second control unit 312 specifies the detection target corresponding to identification information contained in the input signal with reference to the storage unit 30, and causes the second communication unit 292 to transmit an operation signal indicating that the specified detection target has been operated.

As described above, in a case where the operation mode of the operation device 2A is the second mode for performing operation with use of power supplied from the power generation unit 25, neither the first control unit 311 nor the first communication unit 291 is allowed to function. Accordingly, an operation signal corresponding to a press of the detection target associated with the corresponding power generation element 251 is transmitted only from the second communication unit 292. On the other hand, in a case where the operation mode of the operation device 2A is the second mode, no operation signal corresponding to either a touch operation performed for the touch pad 235, or a tilt operation performed for one of the sticks 236 is transmitted from the operation device 2A. In this manner, in a case where the operation device 2A operates in the second mode, a limitation is imposed on an input operation performed for the operation device 2A, such as a limitation to the operable operators.

As described above, the second control unit 312 is started by power supplied from the power generation elements 251. Accordingly, even in a state where the residual quantity of the battery BT is the predetermined residual quantity or larger and sufficient for transmission of an operation signal from the first communication unit 291, the second control unit 312 is started by power supplied from the power generation elements 251 and causes the second communication unit 292 to transmit an operation signal. In this case, there is a possibility that an operation signal is transmitted from each of the first communication unit 291 and the second communication unit 292 in response to an input operation performed for an identical detection target.

However, when the first control unit 311 causes the first communication unit 291 to transmit an operation signal, the first control unit 311 outputs a regulation signal to the second control unit 312 as described above. In this case, the second control unit 312 regulates transmission of an operation signal from the second communication unit 292 to prevent transmission of an operation signal from each of the first communication unit 291 and the second communication unit 292.

Each of the first control unit 311 and the first communication unit 291 operates with power supplied from the battery BT. On the other hand, in a case where the operation device 2A operates in the second mode, each of the second control unit 312 and the second communication unit 292 operates with power supplied from the power generation elements 251. Accordingly, assuming that a period from press timing of the detection target to transmission timing of the operation signal is defined as a transmission completion period, a longer transmission completion period is likely to be required in the second mode than that in the first mode.

For coping with this situation, the notification unit 27 gives a notification indicating the operation mode of the operation device 2A. Moreover, as will be described in detail below, the game device 4 determines the operation mode of the operation device 2A on the basis of an operation signal received from the operation device 2A and notifies the user of the determined operation mode of the operation device 2A.

In this manner, the user is allowed to recognize the current operation mode of the operation device 2A, and switch between the use of the operation device 2A in the first mode and the use of the operation device 2A in the second mode according to situations.

[Configuration of Charging Control Unit] The charging control unit 313 controls charging by the charging unit 26 for the battery BT. Specifically, the charging control unit 313 specifies the residual quantity of the battery BT on the basis of power (particularly voltage) supplied from the battery BT and regulates charging by the charging unit 26 for the battery BT, in a case where the residual quantity of the battery BT is full.

Figure 4:
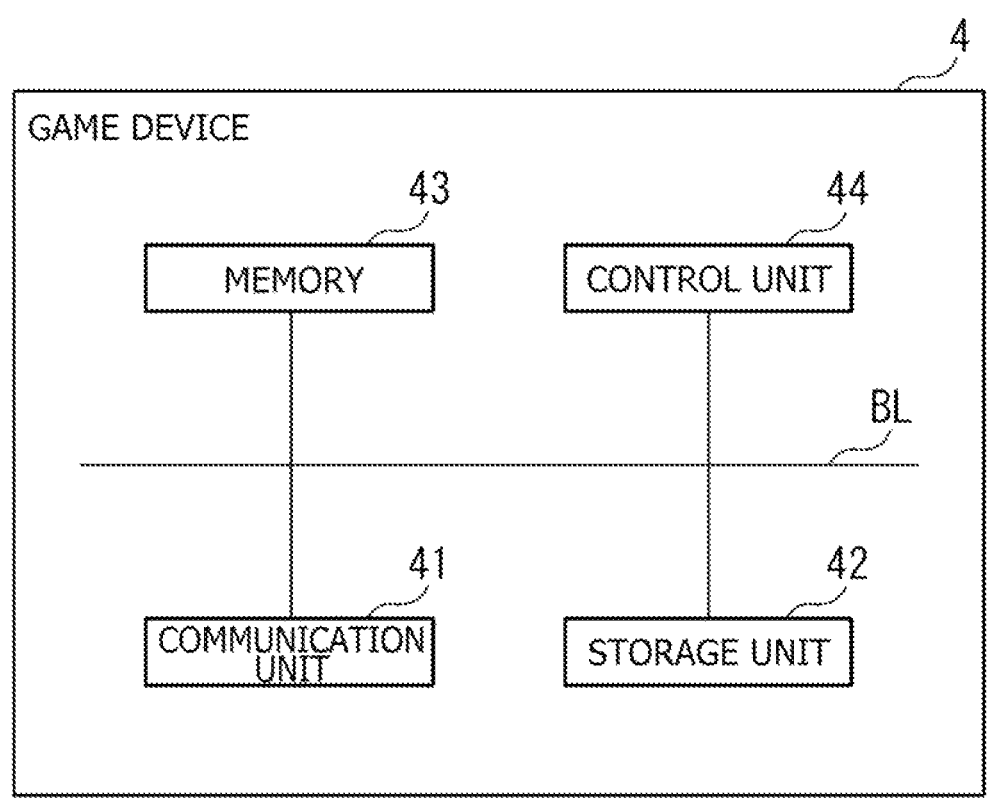
FIG. 4 is a block diagram depicting a configuration of a game device according to the first embodiment.

[Configuration of Game Device] FIG. 4 is a block diagram depicting a configuration of the game device 4.

The game device 4 corresponds to an electronic device. As described above, the game device 4 executes and advances a game according to operation signals received from the operation device 2A, and also displays a screen during execution of the game on the display device 6.

As depicted in FIG. 4, the game device 4 includes a communication unit 41, a storage unit 42, a memory 43, and a control unit 44. The communication unit 41, the storage unit 42, the memory 43, and the control unit 44 are connected by a bus line BL in such a manner as to be communicable with each other.

[Configuration of Communication Unit] Under control by the control unit 44, the communication unit 41 communicates with the operation device 2A, and further communicates with a server SVA, which is an external device, via a network N.

For example, the communication unit 41 receives an operation signal and a residual quantity notification signal transmitted from the operation device 2A, and outputs the received operation signal and the received residual quantity notification signal to the control unit 44. Accordingly, the communication unit 41 corresponds to a reception unit included in the game device 4.

For example, the communication unit 41 transmits a vibration generation signal to the operation device 2A according to a state of progress of the game. Moreover, for example, the communication unit 41 communicates with the server SVA to acquire necessary information from the server SVA.

[Configurations of Storage Unit and Memory] The storage unit 42 stores programs and data necessary for performing operations of the game device 4. For example, the storage unit 42 stores an OS (operating System) for controlling the game device 4. Moreover, for example, the storage unit 42 stores pairing information indicating paring with the operation device 2A. According to the present embodiment, the game device 4 is configured to execute games. Therefore, the storage unit 42 can store game programs. In addition, in a case where the game device 4 has an optical drive, game programs may be recorded in an optical disk readable by the optical drive.

The memory 43 is a work memory of the control unit 44. The memory 43 temporarily stores programs and data read from the storage unit 42 or an optical disk.

Figure 5:
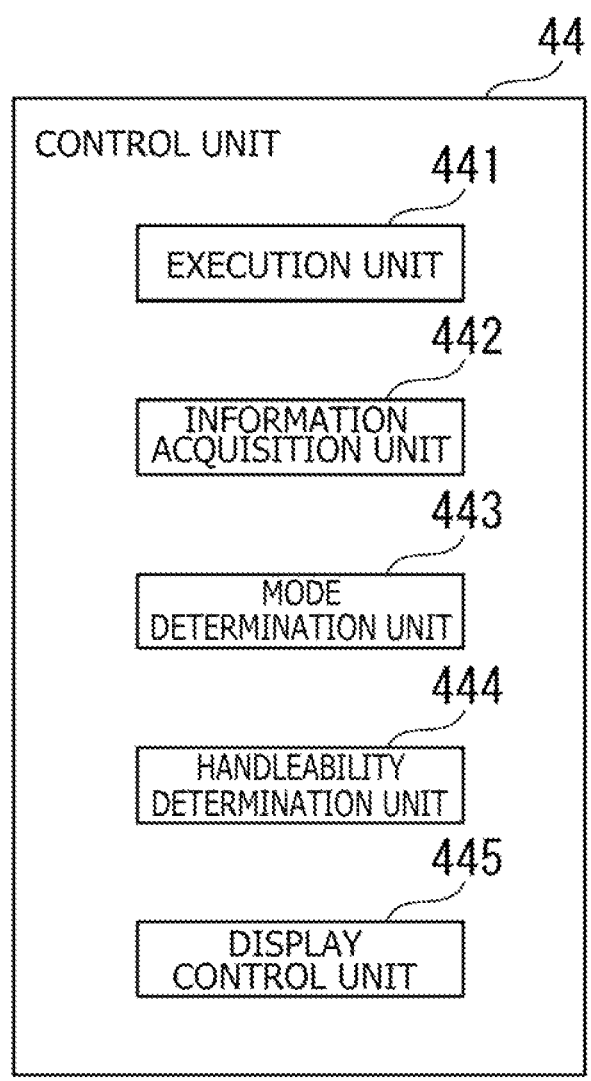
FIG. 5 is a block diagram depicting function units included in a control unit according to the first embodiment.

[Configuration of Control Unit] FIG. 5 is a block diagram depicting function units included in the control unit 44.

The control unit 44 includes an arithmetic processing device such as a CPU (Central Processing Unit), and controls operations of the game device 4.

As depicted in FIG. 5, the control unit 44 has an execution unit 441, an information acquisition unit 442, a mode determination unit 443, a handleability determination unit 444, and a display control unit 445.

The execution unit 441 reads and executes an OS and a game program from the storage unit 42 and advances a game according to operation signals received from the operation device 2A.

The information acquisition unit 442 communicates with the server SVA via the communication unit 41, and acquires information associated with the game currently executed. For example, the information acquisition unit 442 acquires, from the server SVA, information indicating a category of the game currently executed, or information indicating whether or not the game executable by the execution unit 441 is handleable in the second mode of the operation device 2A. The information acquisition unit 442 stores information acquired from the server SVA in the storage unit 42.

The mode determination unit 443 determines which of the first mode and the second mode has been selected as the operation mode of the operation device 2A on the basis of an operation signal received by the communication unit 41 from the operation device 2A. Specifically, in a case where the operation signal is determined to be a signal transmitted from the first communication unit 291 on the basis of information contained in the received operation signal, the mode determination unit 443 determines that the operation mode of the operation device 2A is the first mode. On the other hand, in a case where the operation signal is determined to be a signal transmitted from the second communication unit 292 on the basis of information contained in the received operation signal, the mode determination unit 443 determines that the operation mode of the operation device 2A is the second mode.

In a case where the mode determination unit 443 determines that the operation mode of the operation device 2A is the second mode, the handleability determination unit 444 determines whether or not the game currently executed is handleable in the second mode of the operation device 2A.

Here, a game requiring only low immediate responsiveness, i.e., a game allowed to be advanced even in a relatively long transmission completion period, is also allowed to be advanced by the operation device 2A in the second mode of the operation mode. Examples of this game category include an adventure game and a simulation game.

On the other hand, a game requiring highly immediate responsiveness, i.e., a game which may cause a problem in progress of the game if a relatively long transmission completion period is needed, the game is not easily advanced by the operation device 2A in the state where the operation mode is the second mode, i.e., the operation device 2A which is likely to require a long transmission completion period. Examples of this game category include a shooting game and an action game.

Accordingly, in a case where information indicating the category of the game currently executed is acquired from the server SVA, for example, the handleability determination unit 444 determines whether or not the category of the game currently executed is handleable in the second mode of the operation device 2A on the basis of the acquired information.

In a case where the category of the game currently executed is handleable in the second mode of the operation device 2A, the handleability determination unit 444 determines that the game currently executed is advanceable by the operation device 2A in the second mode of the operation mode. In a case where the category is not handleable, the handleability determination unit 444 determines that the game currently executed is difficult to advance by the operation device 2A in the second mode of the operation mode. Accordingly, the category handleable in the second mode is defined as a category of such a game advanceable without causing any particular problem even by the operation device 2A operating in the second mode.

Moreover, in a case where information indicating whether or not the game currently executed is handleable in the second mode of the operation device 2A is acquired from the server SVA, for example, the handleability determination unit 444 determines whether or not the game currently executed is handleable in the second mode of the operation device 2A on the basis of this information. In a case where the game currently executed is handleable in the second mode of the operation device 2A, the handleability determination unit 444 determines that the game currently executed is advanceable by the operation device 2A in the second mode of the operation mode. In a case where the game is not handleable, the handleability determination unit 444 determines that the game currently executed is difficult to advance by the operation device 2A in the second mode of the operation mode. Accordingly, the game handleable in the second mode is defined as such a game advanceable without causing any particular problem even by the operation device 2A operating in the second mode.

Figure 6:
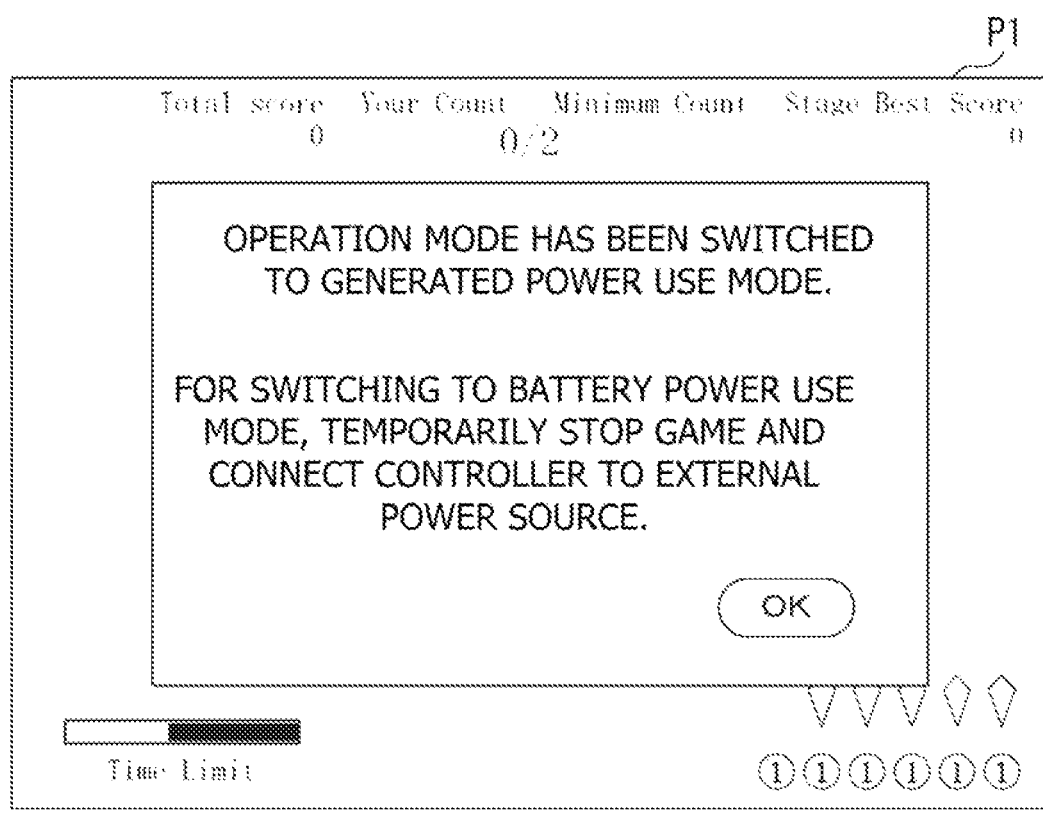
FIG. 6 is a diagram depicting an example of a screen during execution displayed on a display device according to the first embodiment.
Figure 7:
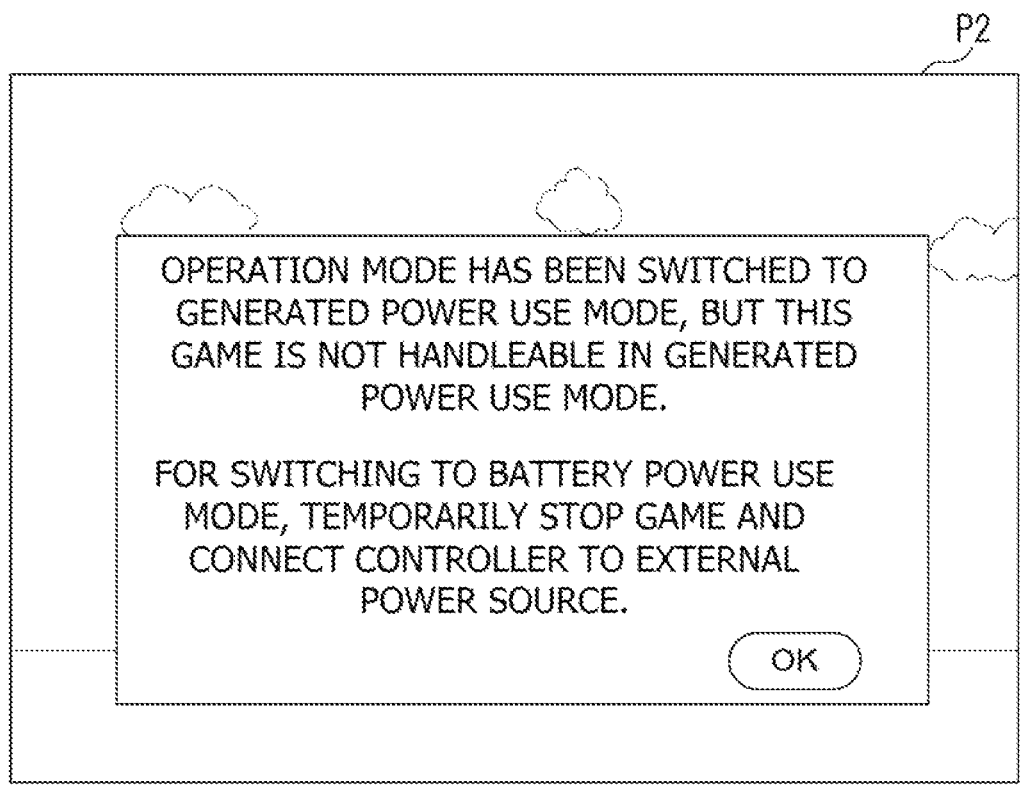
FIG. 7 is a diagram depicting an example of a screen during execution displayed on the display device according to the first embodiment.

FIGS. 6 and 7 are diagrams depicting screens during execution P1 and P2, respectively, which are examples of a screen displayed on the display device 6 by the display control unit 445.

The display control unit 445 generates a screen during execution of the game executed by the execution unit 441 and displays the screen during execution on the display device 6.

For example, when the mode determination unit 443 determines that the operation mode of the operation device 2A has been switched to the second mode, the display control unit 445 displays, on the display device 6, a message that the operation mode of the operation device 2A has been switched to the second mode (generated power use mode), as in the screen during execution P1 depicted in FIG. 6.

At this time, in a case where the handleability determination unit 444 determines that the game currently executed is not handleable in the second mode of the operation device 2A, the display control unit 445 displays, on the display device 6, a message that the operation mode of the operation device 2A has been switched to the second mode (generated power use mode), and that the game currently executed is not handleable in the second mode of the operation device 2A, as in the screen P2 during execution depicted in FIG. 7.

Accordingly, the display control unit 445 has a function of a notification unit.

Figure 8:
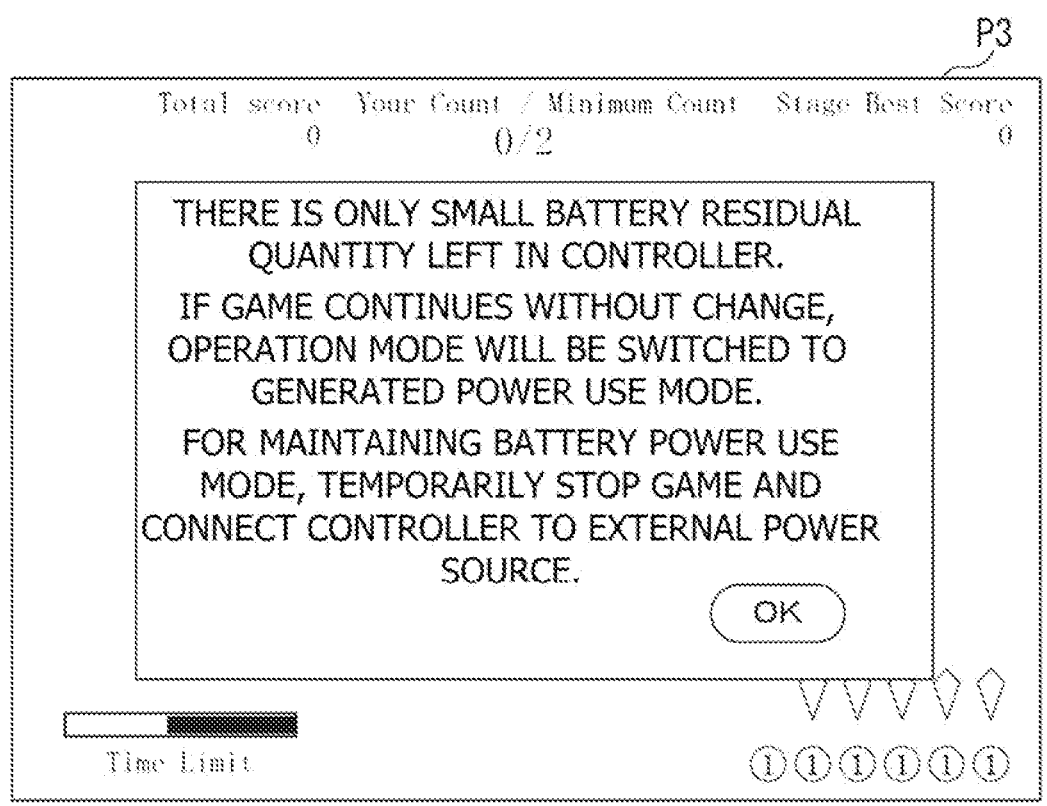
FIG. 8 is a diagram depicting an example of a screen during execution displayed on the display device according to the first embodiment.
Figure 9:
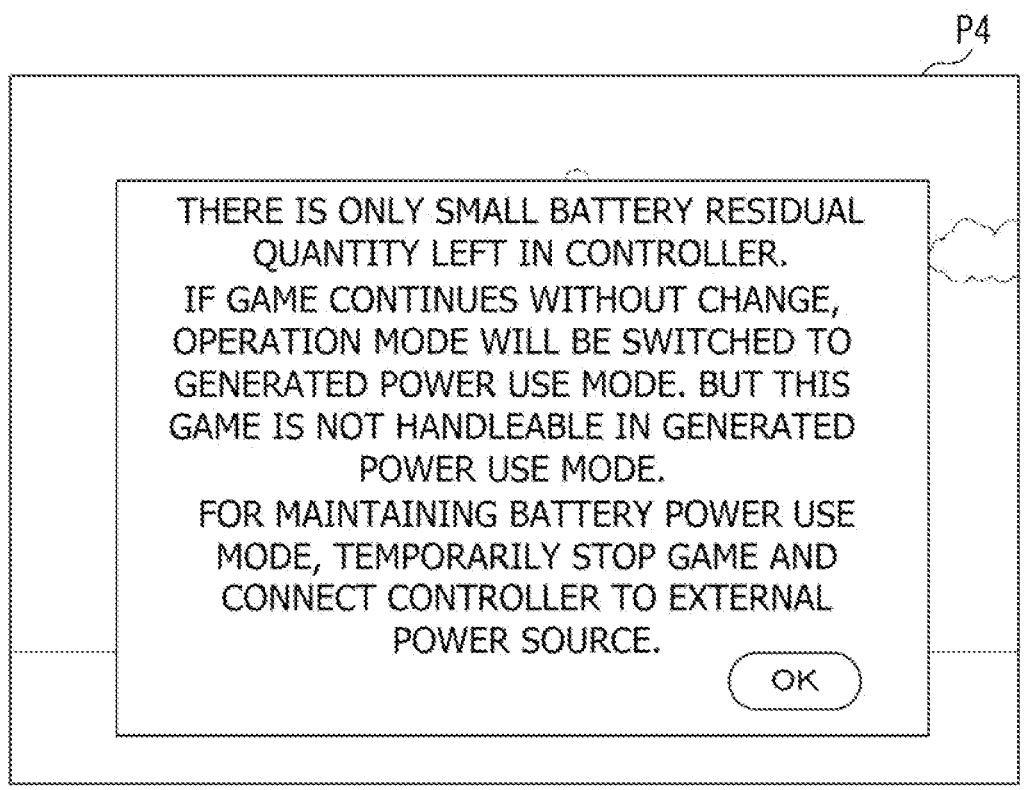
FIG. 9 is a diagram depicting an example of a screen during execution displayed on the display device according to the first embodiment.

FIGS. 8 and 9 are diagrams depicting screens during execution P3 and P4, respectively, which are examples of a screen displayed on the display device 6 by the display control unit 445.

Note that the display control unit 445 may display a screen during execution for indicating switching of the operation mode of the operation device 2A in response to a residual quantity notification signal received from the operation device 2A.

For example, in a case of determination that the residual quantity of the battery BT is a value close to the predetermined residual quantity, i.e., the operation mode of the operation device 2A is in a state immediately before switching from the first mode to the second mode on the basis of the residual quantity notification signal, the display control unit 445 may display a message that the operation mode of the operation device 2A is to be switched to the second mode on the display device 6, as in the screen during execution P3 depicted in FIG. 8.

At this time, in a case where the handleability determination unit 444 determines that the game currently executed is not handleable in the second mode of the operation device 2A, the display control unit 445 may display, on the display device 6, a message that the operation mode of the operation device 2A is to be switched to the second mode, and that the game currently executed is not handleable in the second mode of the operation device 2A, as in the screen P2 during execution depicted in FIG. 9.

Note that the message presenting the above contents is displayed while overlapped on the game screen. Accordingly, the game is temporarily interrupted at the time of display of the screens during execution P1 to P4. The game is restarted when a predetermined operation, such as an operation of pressing an "OK" button, is performed for any of the screens P1 to P4 during execution.

Figure 10:
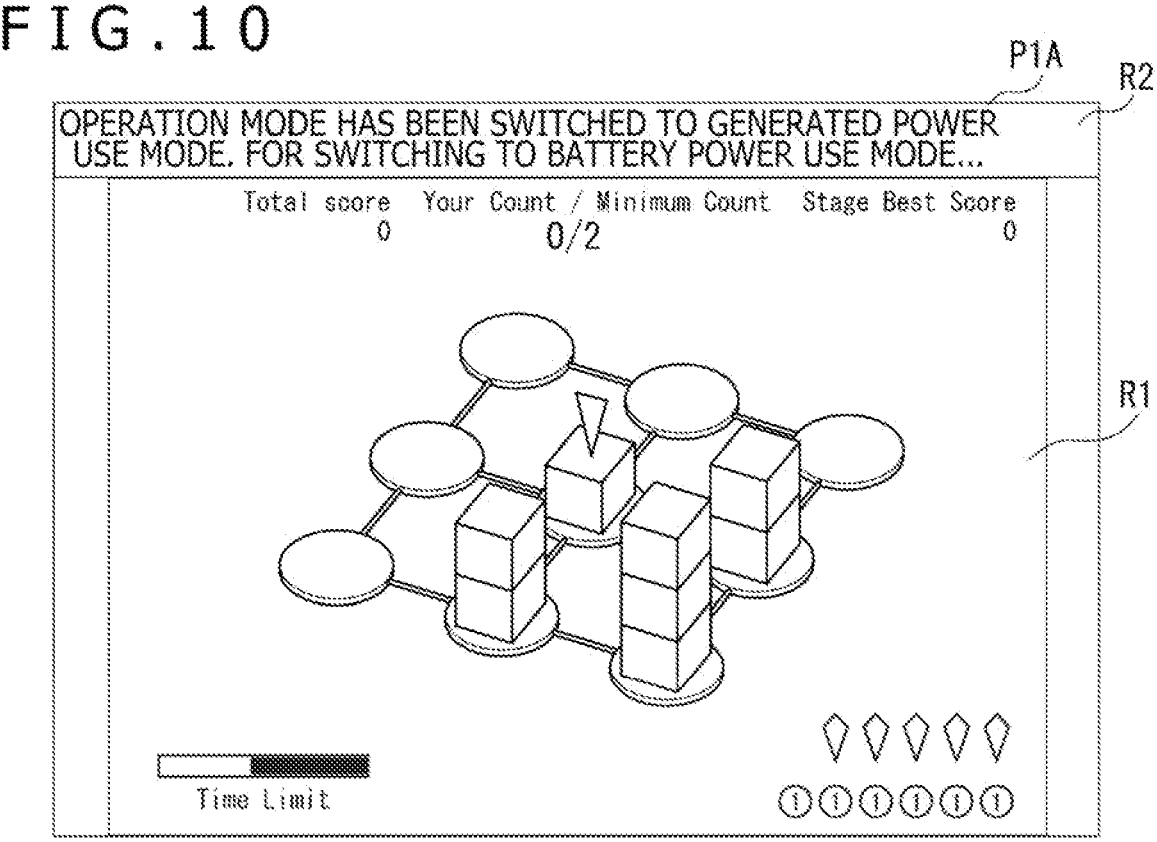
FIG. 10 is a diagram depicting a modification of a screen during execution according to the first embodiment.

FIG. 10 is a diagram depicting a screen during execution P1A which is a modification of the screen during execution P1.

Meanwhile, the message having the above contents may be displayed in a manner not interrupting the game.

For example, the screen during execution P1A depicted in FIG. 10 may be displayed instead of the screen during execution P1 depicted in FIG. 6. The screen during execution P1A includes a screen region R1 where the game screen in the screen during execution P1 is displayed, and a message region R2 where a message is displayed. The screen region R1 in the screen during execution P1A is displayed with reduction to a size smaller than the game screen in the screen during execution P1. The message region R2 is disposed at a position not overlapping with the screen region R1. In addition, in a case where a message has a relatively large number of characters in the message region R2 which has a small size, the full sentences of the message may be presented by scrolling the contents of the message, for example. Moreover, the position of the message region R2 in the screen during execution P1A is not limited to the position on the upper side with respect to the screen region R1 but may be a position on any one of the lower side, the right side, and the left side.

Furthermore, a message through which the game screen is transmittable to such a level that the game screen is recognizable may be displayed in each of the screens during execution P1 to P4 so as not to interrupt the game currently executed. At this time, a message may be superimposed on the game screen, and displayed by scrolling the contents of the message, for example.

Note that the display control unit 445 has a function of a notification unit in the present embodiment described above. However, this example is not required to be adopted. The configuration of the game device 4 may include such a notification unit which gives a notification of various types of information by use of sound or lighting of an indicator or the like.

[Advantageous Effects of First Embodiment] The game system 1A according to the present embodiment described above can offer the following advantageous effects.

The operation device 2A includes the operation unit 23 containing the buttons 231 to 234 and the touch pad 235, the power generation elements 251 each generating power according to an operation performed for the operation unit 23, the battery BT supplying power, and the communication unit 29A transmitting an operation signal corresponding to the operation unit 23 having been operated. By using the first communication unit 291 and the second communication unit 292, the communication unit 29A transmits an operation signal with power supplied from the battery BT, in a case where the residual quantity of the battery BT is a predetermined residual quantity or larger, and transmits an operation signal with power generated by the power generation elements 251, in a case where the residual quantity of the battery BT is smaller than the predetermined residual quantity.

This configuration achieves transmission of an operation signal by use of power supplied from the battery BT, in a case where the residual quantity of the battery BT is the predetermined residual quantity or larger. Accordingly, transmission of an operation signal is achievable without delay. On the other hand, in a case where the residual quantity of the battery BT is smaller than the predetermined residual quantity, a transmission delay of an operation signal may be produced. However, the operation device 2A does not become disabled. Accordingly, usability of the operation device 2A improves.

The operation device 2A includes the notification unit 27 which gives a notification of an operation state of the operation device 2A by presenting a lighting state. The notification unit 27 lights to give a notification that the communication unit 29A transmits an operation signal by use of power supplied from the battery BT. In addition, the notification unit 27 does not light to give a notification that the communication unit 29A transmits an operation signal by use of power generated by the power generation elements 251.

Alternatively, the notification unit 27 lights in a first color to give a notification that the communication unit 29A transmits an operation signal by use of power supplied from the battery BT. In addition, the notification unit 27 lights in a second color different from the first color to give a notification that the communication unit 29A transmits an operation signal by use of power generated by the power generation elements 251.

This configuration allows the user to check whether the operation mode of the operation device 2A is the first mode which transmits an operation signal by use of power of the battery BT, or the second mode which transmits an operation signal by use of power generated by the power generation elements 251 on the basis of the lighting state of the notification unit 27. Accordingly, usability of the operation device 2A further improves.

The communication unit 29A includes the first communication unit 291 which transmits an operation signal by use of power supplied from the battery BT, and the second communication unit 292 which transmits an operation signal by use of power generated by the power generation elements 251. The operation signal contains information indicating whether the operation signal has been transmitted by power supplied from the battery BT or transmitted by power supplied from the power generation elements 251. In other words, the operation signal contains information indicating whether the operation signal is an operation signal transmitted from the first communication unit 291, or an operation signal transmitted from the second communication unit 292. Accordingly, the operation signal contains information indicating the current operation mode of the operation device 2A.

This configuration allows the game device 4, which is a reception device for receiving an operation signal from the operation device 2A, to recognize the state of the operation device 2A, i.e., the operation mode of the operation device 2A.

According to the operation device 2A, the first control unit 311 functions as a transmission regulation unit, and outputs a regulation signal to the second control unit 312 to regulate transmission of an operation signal from the second communication unit 292 in a case where the first communication unit 291 transmits an operation signal.

This configuration can prevent transmission of an operation signal from each of the first communication unit 291 and the second communication unit 292 in response to an operation performed for the same operator of the operation unit 23.

The operation device 2A includes the charging unit 26 which charges the battery BT using power generated by the power generation elements 251.

This configuration allows charging of the battery BT while using the operation device 2A. Accordingly, usability of the operation device 2A further improves.

The operation device 2A includes the vibration unit 28 which generates vibration at the time of transmission of an operation signal.

This configuration can notify the user of the fact that an operation signal has been transmitted in response to an operation. Accordingly, usability of the operation device 2A further improves.

The operation device 2A includes the housing 21, and the touch pad 235 provided in such a manner as to be able to be inserted or protruded into the housing 21. The operation unit 23 includes the touch pad 235.

This configuration achieves transmission of an operation signal by an operation of the touch pad 235 in a manner of a button. Accordingly, general versatility of the operation device 2A improves.

The game system 1A as an operation system includes the operation device 2A transmitting an operation signal, and the game device 4 functioning as an electronic device which operates by receiving the operation signal from the operation device 2A.

The operation device 2A includes the operation unit 23, the power generation elements 251 generating power according to an operation performed for the operation unit 23, the battery BT supplying power, and the communication unit 29A functioning as a transmission unit which transmits an operation signal corresponding to the operation unit 23 having been operated. The operation device 2A operates in either the first mode where the communication unit 29A transmits an operation signal by use of power supplied from the battery BT, or the second mode where the communication unit 29A transmits an operation signal by use of power generated by the power generation elements 251. The operation signal contains information indicating the operation mode of the operation device 2A.

The game device 4 includes the communication unit 41 functioning as a reception unit, the mode determination unit 443, and the display control unit 445 functioning as a notification unit. The communication unit 41 receives an operation signal from the operation device 2A. The mode determination unit 443 determines the operation mode of the operation device 2A on the basis of an operation signal received by the communication unit 41. The display control unit 445 gives a notification indicating the operation mode of the operation device 2A when the mode determination unit 443 determines that the operation mode of the operation device 2A has been switched from the first mode to the second mode.

According to this configuration, the game device 4 gives a notification indicating the operation mode of the operation device 2A using the display control unit 445 when the operation mode of the operation device 2A is switched to the second mode which may produce a transmission delay of an operation signal from the time of the operation performed by the user. In other words, the display control unit 445 gives a notification that the operation mode of the operation device 2A has been switched to the second mode. This configuration can notify the user of switching to the second mode when the operation mode of the operation device 2A is switched to the second mode to deal with a smaller residual quantity of the battery BT than the predetermined residual quantity. Accordingly, usability of the game system 1A as an operation system improves.

The game device 4 for executing games includes the handleability determination unit 444 which determines whether or not a game is handleable in the second mode when the mode determination unit 443 determines that the operation mode of the operation device 2A is the second mode. The display control unit 445 functioning as a notification unit gives a notification that the game is not handleable in the second mode, when the handleability determination unit 444 determines that the game is not handleable in the second mode.

According to this configuration, the game device 4 can notify the user of the fact that the game currently executed is not handleable in the second mode when the operation mode of the operation device 2A is switched to the second mode. Accordingly, usability of the game system 1A further improves.

Here, a simulation game or a command selective system role playing game can advance the game even if a period from an operation by a user to transmission of an operation signal is relatively long. Accordingly, games in these categories are allowed to proceed even with long latency. On the other hand, games such as a shooting game and an action game are difficult to advance if transmission of an operation signal is delayed from an operation by a user. Accordingly, games in these categories may cause a problem in progress of the games if latency is long.

For coping with this situation, the handleability determination unit 444 determines that the game currently executed is not handleable in the second mode on the basis of information acquired from the server SVA in a case of determination that the category of the game executed is a predetermined category such as an action game.

This configuration allows the user to easily carry out operations such as charging of the battery BT.

The handleability determination unit 444 determines whether or not the game currently executed is handleable in the second mode, on the basis of information associated with the game.

This configuration can determine whether or not the game currently executed is handleable in the second mode.

[Second Embodiment] A second embodiment of the present disclosure will subsequently be described.

A game system according to the present embodiment has a configuration similar to the configuration of the game system 1A of the first embodiment. Note herein that the operation device 2A of the first embodiment automatically switches the operation mode from one of the first mode and the second mode to the other mode according to the residual quantity of the battery BT. Specifically, the operation device 2A is configured to operate in the first mode when the residual quantity of the battery BT is the predetermined residual quantity or larger. However, the operation device 2A is configured to stop power supply from the battery BT and automatically switch the operation mode to the second mode when the residual quantity of the battery BT becomes smaller than the predetermined residual quantity. On the other hand, according to the game system of the present embodiment, the user can manually switch the operation mode of the operation device. The game system of the present embodiment is different from the game system 1A of the first embodiment in this point.

Note that parts presented in the following description and identical or substantially identical to the corresponding parts already described are given identical reference signs to omit the same description.

Figure 11:
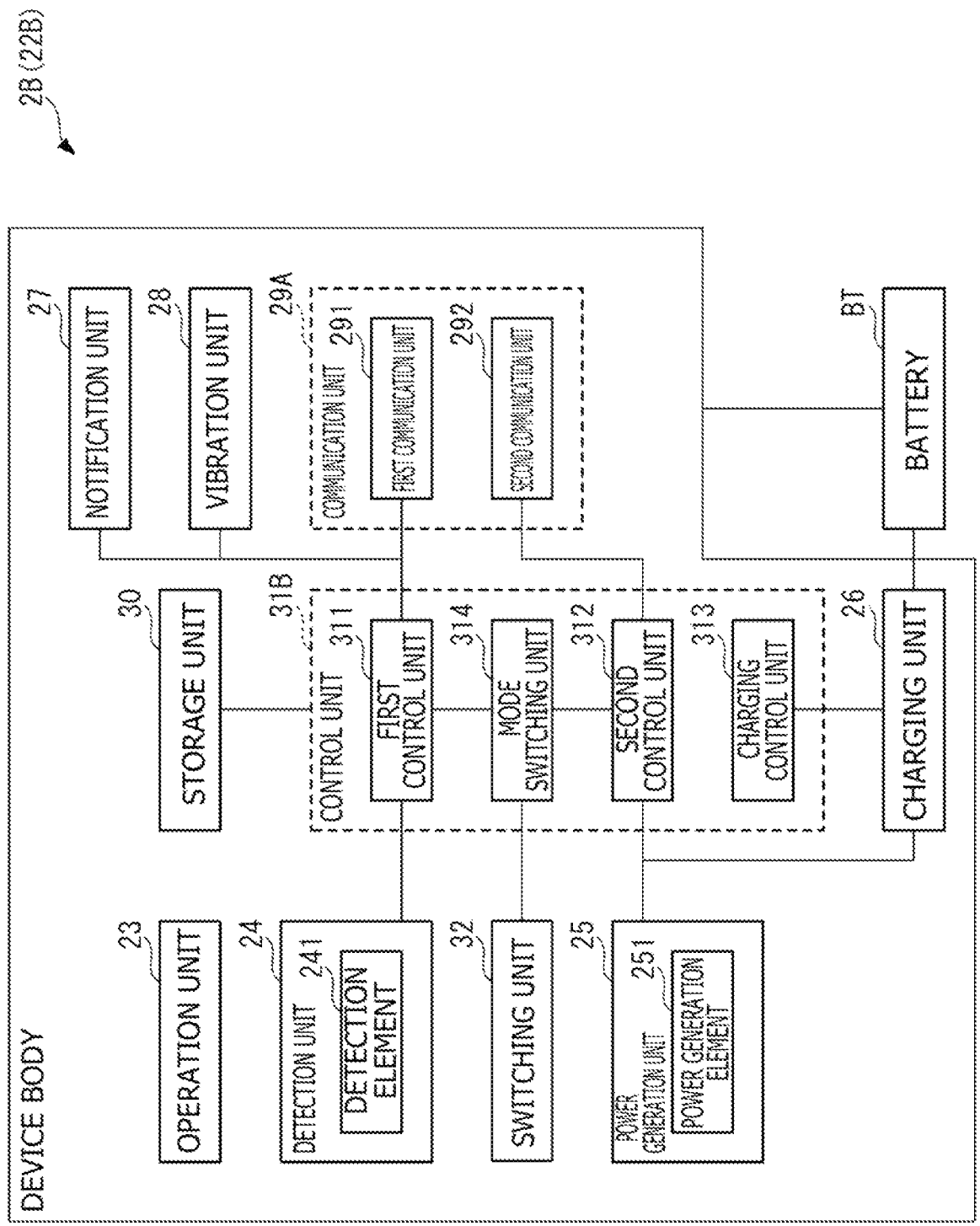
FIG. 11 is a block diagram depicting a configuration of a device body included in an operation device of a game system according to a second embodiment.

[General Configuration of Game System] FIG. 11 is a block diagram depicting a configuration of an operation device 2B.

The game system according to the present embodiment corresponds to an operation system. The game system according to the present embodiment has configurations and functions similar to those of the game system 1A of the first embodiment except for a point that the operation device 2B depicted in FIG. 11 is provided instead of the operation device 2A. Specifically, the game system according to the present embodiment includes the operation device 2B, the game device 4, and the display device 6. The game system of the present embodiment operates in manners similar to the manners of the game system 1A. Specifically, the operation device 2B transmits an operation signal corresponding to an input operation input by the user. The game device 4 advances a game according to the operation signal. The display device 6 displays a screen during execution of the game.

Respective configurations of the game system according to the present embodiment will hereinafter be described.

[Configuration of Operation Device] By using the first communication unit 291 or the second communication unit 292, the operation device 2B transmits an operation signal corresponding to an input operation input by the user similarly to the operation device 2A.

The operation device 2B is configured not only to switch the operation mode according to the residual quantity of the battery BT, but also to switch the operation mode according to an operation performed by the user when the residual quantity of the battery BT is the predetermined residual quantity or larger.

The operation device 2B includes the housing 21 and a device body 22B.

As depicted in FIG. 11, the device body 22B has configurations and functions similar to those of the device body 22A except for points that a control unit 31B is provided instead of the control unit 31A, and that a switching unit 32 is further provided. Specifically, the device body 22B includes the operation unit 23, the detection unit 24, the power generation unit 25, the charging unit 26, the notification unit 27, the vibration unit 28, the communication unit 29A, the storage unit 30, the control unit 31B, and the switching unit 32.

[Configuration of Switching Unit] The switching unit 32 is a unit operated by the user at the time of switching of the operation mode of the operation device 2B. When the switching unit 32 is operated, the switching unit 32 outputs a switching signal corresponding to the operation to the control unit 31B by use of power of the battery BT. Accordingly, in a case where the residual quantity of the battery BT is smaller than the predetermined residual quantity, the switching unit 32 is unable to transmit a switching signal even in a case where the user operates the switching unit 32 to switch to the first mode. Accordingly, the operation for switching the operation mode of the operation device 2B to the first mode is cancelled in a case where the residual quantity of the battery BT is smaller than the predetermined residual quantity.

Note that the switching unit 32 presented by way of example may include a button, and an output circuit which outputs a switching signal for switching between the first mode and the second mode to the control unit 31B every time the button is pressed. Alternatively, the switching unit 32 presented by way of example may include a switch, and an output circuit which outputs a switching signal for switching to the first mode to the control unit 31B in response to sliding of the switch to one side, and outputs a switching signal for switching to the second mode to the control unit 31B in response to sliding of the switch to the other side.

[Configuration of Control Unit] The control unit 31B controls operations of the operation device 2B similarly to the control unit 31A. The control unit 31B includes a mode switching unit 314 in addition to the first control unit 311, the second control unit 312, and the charging control unit 313.

The mode switching unit 314 switches the operation mode of the operation device 2B according to a switching signal input from the switching unit 32.

Specifically, in a case where the user operates the switching unit 32 to switch the operation mode of the operation device 2B to the first mode, the mode switching unit 314 actuates the first control unit 311 and regulates the operation of the second control unit 312 according to a switching signal input from the switching unit 32. In this manner, the mode switching unit 314 sets the operation mode of the operation device 2B to the first mode.

On the other hand, in a case where the user operates the switching unit 32 to switch the operation mode of the operation device 2B to the second mode, the mode switching unit 314 regulates the operation of the first control unit 311 and actuates the second control unit 312 according to a switching signal input from the switching unit 32. In this manner, the mode switching unit 314 sets the operation mode of the operation device 2B to the second mode.

[Configuration of Game Device] Also in the game system of the present embodiment, the game device 4 similarly advances a game according to operation signals received from the operation device 2B and displays a screen during execution of the game on the display device 6.

Note herein that the operation mode of the operation device 2B can be switched to the second mode not only in the case where the residual quantity of the battery BT becomes smaller than the predetermined quantity, but also according to an operation performed by the user.

According to the game device 4 of the present embodiment, therefore, when the mode determination unit 443 determines that the operation mode of the operation device 2B is the second mode on the basis of an operation signal received from the operation device 2B, the display control unit 445 gives a notification that the operation mode of the operation device 2B has been switched from the first mode (battery power use mode) to the second mode (generated power use mode) by displaying a message on the screen during execution, for example.

Figure 12:
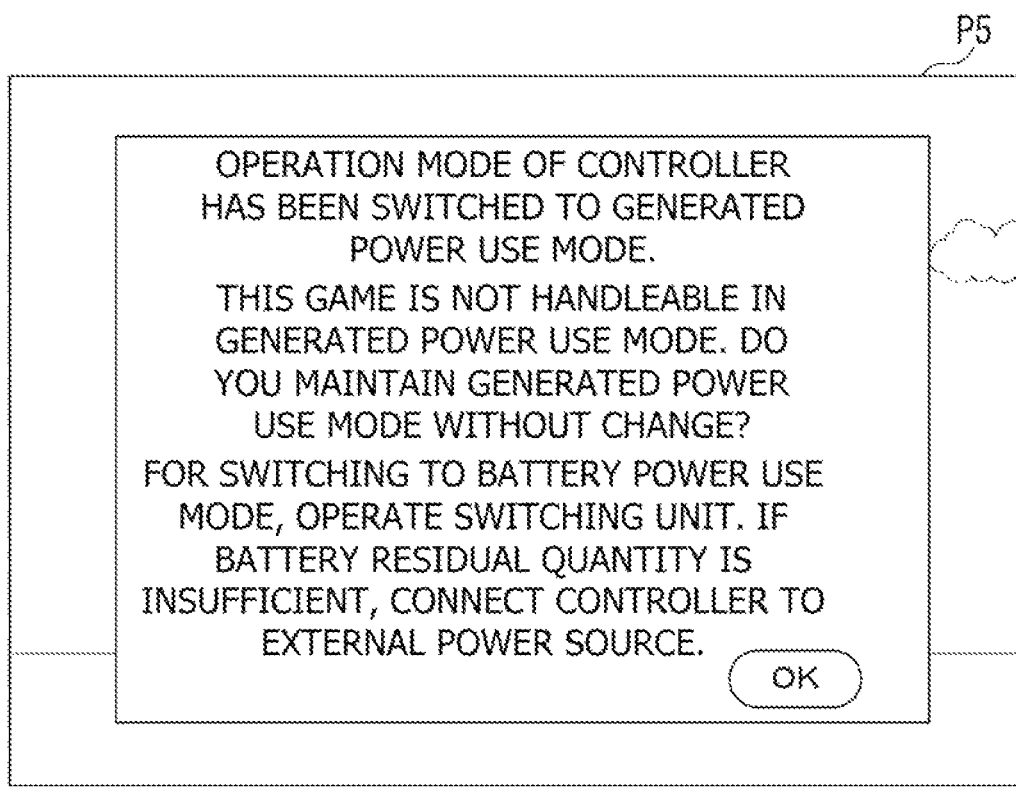
FIG. 12 is a diagram depicting an example of a screen during execution displayed on a display device according to the second embodiment.

FIG. 12 is a diagram depicting a screen during execution P5 as an example of a screen during execution displayed by the game device 4.

When the mode determination unit 443 determines that the operation mode of the operation device 2B is the second mode, the handleability determination unit 444 determines whether or not the game currently executed is handleable in the second mode of the operation device 2B on the basis of information acquired from the server SVA. Thereafter, in a case where the handleability determination unit 444 determines that the game currently executed is not handleable in the second mode, the display control unit 445 having a function of a notification unit gives a notification that the game currently executed is not handleable in the second mode (generated power use mode) of the operation device 2B in addition to the fact that the operation mode of the operation device 2B has been switched to the second mode by displaying the screen P5 during execution depicted in FIG. 12, for example.

Note that the message displayed in the screen during execution P5 may be displayed in a manner not to interrupt the game currently executed, similarly to the screens during execution P1 to P4. For example, similarly to the screen during execution P1A, a message representing that the operation mode of the operation device 2B has been switched to the second mode, and that the game currently executed is not handleable in the second mode may be displayed in the message region R2 not overlapping with the screen region R1. Moreover, for example, a message transmittable to such a level that the game screen is observable may be superimposed and displayed on the game screen.

[Advantageous Effects of Second Embodiment] The game system according to the present embodiment described above can offer the following advantageous effects as well as advantageous effects similar to those of the game system 1A of the first embodiment.

The operation device 2B includes the operation unit 23, the power generation elements 251 each generating power according to an operation performed for the operation unit 23, the battery BT supplying power, the switching unit 32 switching the operation mode according to an operation performed by the user, and the communication unit 29A transmitting an operation signal corresponding to the operation unit 23 having been operated. The communication unit 29A transmits the operation signal by use of power accumulated in the battery BT, in a case where the operation mode is the first mode. The communication unit 29A transmits the operation signal by use of power generated by the power generation elements 251, in a case where the operation mode is the second mode.

According to this configuration, the user is allowed to select the desired operation mode from the first mode which consumes power accumulated in the battery BT but achieves transmission of an operation signal without delay, and the second mode which may produce a delay but preserves power accumulated in the battery BT. In this manner, even in a case where a certain residual quantity remains in the battery BT, for example, this residual quantity can be preserved in the battery BT by switching to the second mode. Accordingly, replacement of the battery BT and the frequency of charging can be both reduced. As a result, usability of the operation device 2B improves.

The operation device 2B includes the mode switching unit 314 which switches the operation mode to one of the first mode and the second mode according to a switching signal input from the switching unit 32. The switching unit 32 outputs a switching signal using power supplied from the battery BT.

According to this configuration, the switching unit 32 is unable to output a switching signal unless power sufficient for outputting a switching signal from the switching unit 32 remains in the battery BT. Accordingly, in a case where only a small residual quantity remains in the battery BT, the operation mode of the operation device 2B is unable to switch to the first mode, of the first and second modes, as the mode for transmitting an operation signal by use of power supplied from the battery BT. In this manner, regulation of switching to the first mode is achievable according to the residual quantity of the battery BT. As a result, usability of the operation device 2B further improves.

[Third Embodiment] A third embodiment of the present disclosure will subsequently be described.

A game system according to the present embodiment has a configuration similar to the configurations of the game systems of the first and second embodiments, but is different from the game systems of the first and second embodiments in a point that a condition for switching from the first mode to the second mode is further added.

Note that parts presented in the following description and identical or substantially identical to the corresponding parts already described are given identical reference signs to omit the same description.

Figure 13:
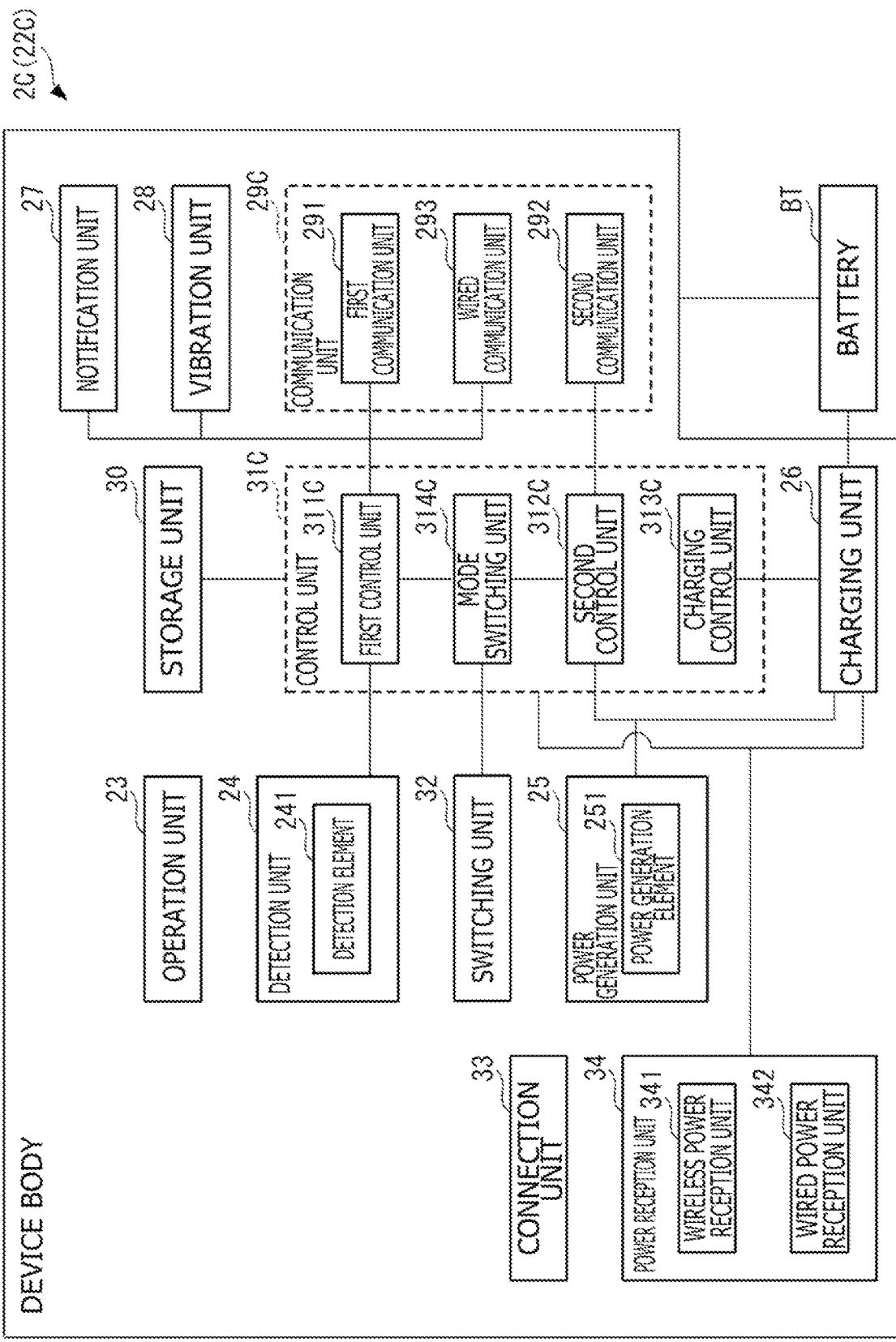
FIG. 13 is a block diagram depicting a configuration of a device body included in an operation device of a game system according to a third embodiment.

[General Configuration of Game System] FIG. 13 is a block diagram depicting a configuration of an operation device 2C included in the game system according to the present embodiment.

The game system according to the present embodiment corresponds to an operation system. The game system according to the present embodiment has configurations and functions similar to those of the game system of the second embodiment except for a point that the operation device 2C depicted in FIG. 12 is provided instead of the operation devices 2A and 2B. Specifically, the game system according to the present embodiment includes the operation device 2C, the game device 4, and the display device 6. The game system of the present embodiment operates in manners similar to the manners of the game system of the second embodiment. Specifically, the operation device 2C transmits an operation signal corresponding to an input operation input by the user. The game device 4 advances a game according to the operation signal. The display device 6 displays a screen during execution of the game.

Respective configurations of the game system according to the present embodiment will hereinafter be described.

[Configuration of Operation Device] The operation device 2C transmits an operation signal corresponding to an input operation input by the user similarly to the operation devices 2A and 2B.

Similarly to the operation devices 2A and 2B, the operation device 2C has a first function which automatically switches the operation mode from the first mode to the second mode when the residual quantity of the battery BT decreases and reaches a quantity smaller than the predetermined residual quantity. Moreover, similarly to the operation device 2B, the operation device 2C has a second function which switches the operation mode according to an operation performed by the user when the residual quantity of the battery BT is the predetermined residual quantity or larger.

Further, the operation device 2C has a third function which allows switching from the second mode to the first mode in a case where power supplied from the outside is larger than predetermined power, i.e., in a case where voltage supplied from the outside is higher than predetermined voltage, even when the residual quantity of the battery BT is smaller than the predetermined residual quantity.

[Configuration of Device Body] The operation device 2C includes the housing 21 and a device body 22C.

As depicted in FIG. 12, the device body 22C has configurations and functions similar to those of the device body 22B except for points that a communication unit 29C and a control unit 31C are provided instead of the communication unit 29A and the control unit 31A, and that a connection unit 33 and a power reception unit 34 are further provided. Specifically, the device body 22C includes the operation unit 23, the detection unit 24, the power generation unit 25, the charging unit 26, the notification unit 27, the vibration unit 28, the communication unit 29C, the storage unit 30, the control unit 31C, the switching unit 32, the connection unit 33, and the power reception unit 34.

[Configuration of Connection Unit] The connection unit 33 is a terminal capable of receiving supply of power from an electronic device such as the game device 4 via a cable or the like, and communicating with the connected electronic device. In a case where the operation device 2C and the game device 4 are connected to each other by a wire, a wired communication unit 293 included in the communication unit 29C and described below communicates with the game device 4 via the connection unit 33. For example, the connection unit 33 may be constituted by a USB (Universal Serial Bus) terminal.

[Configuration of Power Reception Unit] The power reception unit 34 receives power transmitted from the outside, and outputs the received power to the charging unit 26 and the control unit 31C. The power reception unit 34 includes a wireless power reception unit 341 and a wired power reception unit 342.

The wireless power reception unit 341 receives power wirelessly supplied from the outside, and outputs the received power. The wireless power reception unit 341 may adopt a radio wave reception type configuration which has an antenna, and a rectifying circuit which converts electromagnetic waves received by the antenna into direct currents. Alternatively, the wireless power reception unit 341 may adopt such a configuration which has a resonator magnetically resonating with a resonator on the power transmission side and receives power by a magnetic resonance system. Instead, the wireless power reception unit 341 may adopt an electromagnetic induction type configuration or an electric field coupling system configuration. Note that the device on the transmission side for transmitting power to the wireless power reception unit 341 may be constituted by the game device 4, or other devices.

The wired power reception unit 342 receives power supplied from the outside and outputs the received power via the connection unit 33.

[Configuration of Communication Unit] Similarly to the communication unit 29A, the communication unit 29C transmits an operation signal corresponding to an input operation performed by the user for the operation unit 23 under control by the control unit 31C. The communication unit 29C includes the first communication unit 291 and the second communication unit 292, and further includes a wired communication unit 293.

In a case where the connection unit 33 is connected to the game device 4, the wired communication unit 293 transmits an operation signal to the game device 4 by a wire via the connection unit 33 under control by the first control unit 311. In addition, in a case where the wired communication unit 293 communicates with the game device 4, communication with the game device 4 achieved using the first communication unit 291 and the second communication unit 292 is regulated by the control unit 31C.

[Configuration of Control Unit] The control unit 31C controls operations of the operation device 2C. The control unit 31C includes a first control unit 311C, a second control unit 312C, a charging control unit 313C, and a mode switching unit 314C.

[Configuration of Charging Control Unit] The charging control unit 313C charges the battery BT by controlling the charging unit 26 to charge the battery BT by use of power output from the power generation elements 251 and the power reception unit 34. Note that the charging control unit 313C regulates charging of the battery BT by the charging unit 26, in a case where the residual quantity of the battery BT is full, similarly to the charging control unit 313.

[Configuration of Mode Switching Unit] Similarly to the mode switching unit 314, the mode switching unit 314C switches the operation mode of the operation device 2C to either one of the first mode and the second mode and actuates either one of the first control unit 311C and the second control unit 312.

Specifically, in a case where the residual quantity of the battery BT is the predetermined residual quantity or larger, the mode switching unit 314C switches the operation mode of the operation device 2C to either one of the first mode and the second mode according to a switching signal when the switching signal is input from the switching unit 32. Specifically, in a case where the residual quantity of the battery BT is the predetermined residual quantity or larger, the operation mode of the operation device 2C is switchable to both of the first mode and the second mode.

Moreover, in a case where the power received by the power reception unit 34 has a predetermined value or higher even when the residual quantity of the battery BT is smaller than the predetermined residual quantity, the mode switching unit 314C switches the operation mode of the operation device 2C to either one of the first mode and the second mode according to a switching signal when the switching signal is input from the switching unit 32. Note that the mode switching unit 314C may automatically switch the operation mode of the operation device 2C to the first mode in a case where the power output from the wireless power reception unit 341 or the wired power reception unit 342 has a predetermined value or higher.

On the other hand, the mode switching unit 314C switches the operation mode of the operation device 2C to the second mode in a case where the power received by the power reception unit 34 has a value lower than the predetermined value and the residual quantity of the battery BT is smaller than the predetermined residual quantity. In this situation, even in a case where a switching signal for switching the operation mode of the operation device 2C to the first mode is input from the switching unit 32, the mode switching unit 314C maintains the second mode while ignoring the switching signal thus input.

[Configuration of First Control Unit] The first control unit 311C has a function similar to the function of the first control unit 311. Specifically, the first control unit 311C operates in a case where the operation device 2C is in the first mode, and controls the notification unit 27, the vibration unit 28, and the first communication unit 291 by use of power supplied from the battery BT.

Moreover, in a case where the operation device 2C is connected to the game device 4 by a wire via the connection unit 33, the first control unit 311C transmits an operation signal not by the first communication unit 291 but by the wired communication unit 293. Specifically, the first control unit 311C determines whether or not communication with the game device 4 by a wire via the connection unit 33 is allowed, and causes the wired communication unit 293 to transmit an operation signal to the game device 4 in a case of determination that this communication is allowed. In addition, in a case where the first control unit 311C causes the wired communication unit 293 to transmit an operation signal, the first control unit 311C causes the wired communication unit 293 to transmit such an operation signal containing information indicating the operation mode of the operation device 2C.

On the other hand, in a case where the operation device 2C does not communicate with the game device 4 by a wire, i.e., in a case where the operation device 2C wirelessly communicates with the game device 4, the first control unit 311C causes the first communication unit 291 to transmit an operation signal.

[Configuration of Second Control Unit] The second control unit 312C has a function similar to the function of the second control unit 312. Specifically, the second control unit 312C operates in a case where the operation device 2C is in the second mode and controls the second communication unit 292 with power supplied from the power generation elements 251.

Moreover, in a case where the operation device 2C is connected to the game device 4 by a wire via the connection unit 33, the second control unit 312C transmits an operation signal not by the second communication unit 292 but by the wired communication unit 293. Specifically, similarly to the first control unit 311C, the second control unit 312C determines whether or not communication with the game device 4 by a wire via the connection unit 33 is allowed and causes the wired communication unit 293 to transmit an operation signal to the game device 4 in a case of determination that this communication is allowed. In addition, in a case where the second control unit 312C causes the wired communication unit 293 to transmit an operation signal, the second control unit 312C causes the wired communication unit 293 to transmit such an operation signal containing information which indicates the operation mode of the operation device 2C.

On the other hand, in a case where the operation device 2C does not communicate with the game device 4 by a wire, i.e., in a case where the operation device 2C wirelessly communicates with the game device 4, the second control unit 312C causes the second communication unit 292 to transmit an operation signal.

In this manner, the operation device 2C gives priority to wired communication over wireless communication at the time of transmission of an operation signal.

[Configuration of Game Device] Also in the game system of the present embodiment, the game device 4 similarly advances a game according to operation signals received from the operation device 2C and displays a screen during execution of the game on the display device 6.

In a case where the game device 4 communicates with the operation device 2C herein, the mode determination unit 443 determines the operation mode of the operation device 2C on the basis of information contained in a received operation signal, regardless of whether the communication system is wired communication or wireless communication. In a case where the mode determination unit 443 determines that the operation mode of the operation device 2C is the second mode, a screen during execution similar to the screen during execution P1 depicted in FIG. 6 is displayed.

At this time, in a case where the handleability determination unit 444 determines, on the basis of information acquired from the server SVA, that the game currently executed is not handleable in the second mode of the operation device 2C and where power received by the power reception unit 34 has a value lower than the predetermined value, the display control unit 445 having a function of a notification unit displays a screen during execution similar to the screen of execution P5 depicted in FIG. 12.

In this manner, a notification is given to indicate that the operation mode of the operation device 2C has been switched to the second mode, that the game currently executed is not handleable in the second mode, and that the received power is insufficient.

Figure 14:
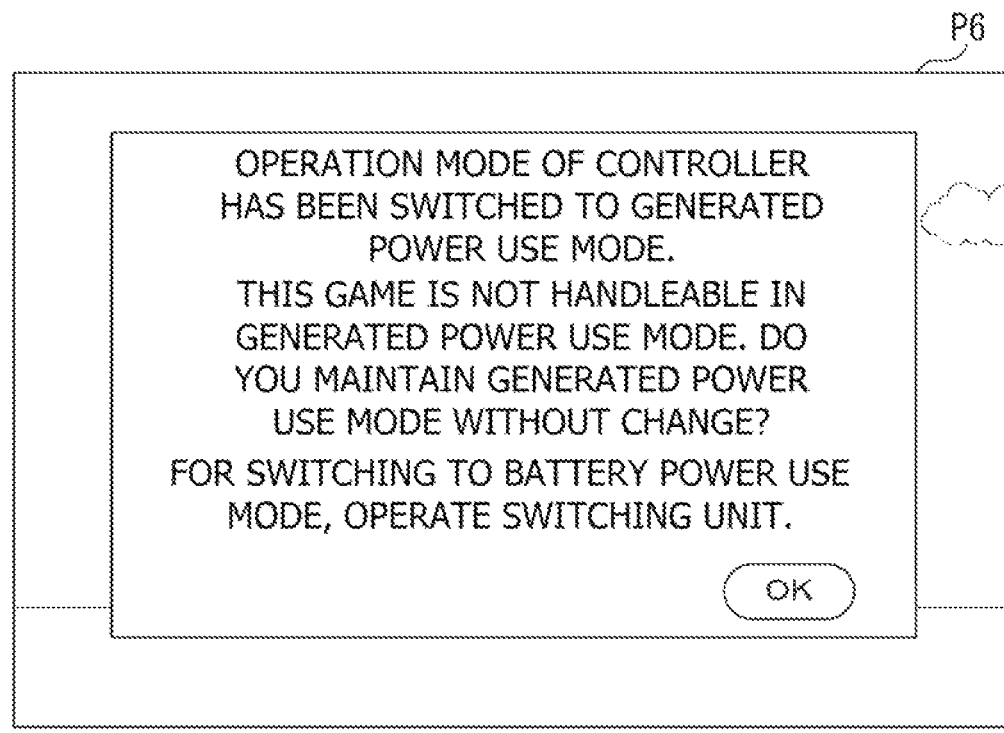
FIG. 14 is a diagram depicting an example of a screen during execution displayed on a display device according to the third embodiment.

FIG. 14 is a diagram depicting a screen during execution P6 as an example of a screen during execution displayed on the display device 6 by the information processing device 7.

Meanwhile, in a case where the handleability determination unit 444 determines that the game currently executed is not handleable in the second mode and where power received by the power reception unit 34 has the predetermined value or higher, the display control unit 445 displays the screen during execution P6 depicted in FIG. 14, for example.

In this manner, a notification is given to indicate that the operation mode of the operation device 2C has been switched to the second mode, that the game currently executed is not handleable in the second mode, and that switching to the first mode is allowed.

Note that the messages displayed in the respective screens during execution may be displayed in a manner not to interrupt the game currently executed, similarly to the game systems of the first and second embodiments. For example, similarly to the screen during execution P1A, each of the messages displayed in the respective screens during execution may be displayed in the message region R2 not overlapping with the screen region R1. Moreover, for example, a message transmittable to such a level that the game screen is observable may be superimposed and displayed on the game screen.

[Advantageous Effects of Third Embodiment] The game system according to the present embodiment described above can offer the following advantageous effects as well as advantageous effects similar to those of the game system 1A of the first embodiment and the game system of the second embodiment.

The operation device 2C includes the operation unit 23, the power generation elements 251 generating power according to an operation performed for the operation unit 23, and the battery BT supplying power. In addition, the operation device 2C includes the power reception unit 34 receiving power supplied from the outside, and the communication unit 29C transmitting an operation signal corresponding to the operation unit 23 having been operated. In a case where the power received by power reception unit 34 has a predetermined value or higher, the communication unit 29C transmits an operation signal by use of power supplied from the battery BT charged by power received by the power reception unit 34. Moreover, in a case where power received by the power reception unit 34 has a value lower than the predetermined value, the communication unit 29C transmits an operation signal by use of power generated by the power generation elements 251.

This configuration achieves transmission of an operation signal by use of power generated by the power generation elements 251 in a case where received power is not sufficiently high, e.g., in a case where power lower than power sufficient for transmitting an operation signal is received, even when power is supplied from the outside. Therefore, even in the case of supply of power from the outside, the operation signal transmission state is switchable according to the power supplied from the outside. Accordingly, usability of the operation device 2C improves.

[Fourth Embodiment] A fourth embodiment of the present disclosure will subsequently be described.

A game system according to the present embodiment has a configuration similar to the configurations of the game systems of the first to third embodiments but is different from the game systems of the first to third embodiments in points that an information processing device is provided in place of the game device 4, and that a server has a configuration of the game device 4. Note that parts presented in the following description and identical or substantially identical to the corresponding parts already described are given identical reference signs to omit the same description.

[General Configuration of Game System] FIG. 15 is a schematic diagram depicting a configuration of a game system 1B according to the present embodiment.

The game system 1B according to the present embodiment corresponds to an operation system. As depicted in FIG. 15, the game system 1B includes the operation device 2A, the information processing device 7, the display device 6, and a server SVB. The game system 1B is capable of achieving cloud gaming where the information processing device 7 transmits operation signals received from the operation device 2A to the server SVB via the network N. The server SVB executes a game according to the received operation signals and transmits an image of a screen during execution obtained as a processing result to the information processing device 7. The information processing device 7 receives the image obtained by the server SVB as the processing result and displays the received image on the display device 6. In this manner, the game is allowed to be advanced.

Specifically, the information processing device 7 functions as a relay device providing a relay between the operation device 2A and the server SVB, and displays the image received from the server SVB on the display device 6.

Note that the information processing device 7 in the example of FIG. 15 is a notebook PC (Personal Computer), and is connected to the network N via an access point AP. However, the information processing device 7 is not limited to a PC but may be other types of information processing device such as a game device and a smartphone. Moreover, in a case where the information processing device 7 is a notebook PC, the display device 6 may be a display device built in the notebook PC.

[Configuration of Server] As described above, the server SVB has a function of the game device 4. Specifically, while not depicted in the figure, the server SVB includes the communication unit 41, the storage unit 42, the memory 43, and the control unit 44 connected to each other via a bus line.

According to the present embodiment, the communication unit 41 communicates with the information processing device 7 via the network N.

The storage unit 42 stores an OS for controlling the server SVB, and game programs. Moreover, the storage unit 42 stores at least either information indicating categories of games executable by the server SVB and categories handleable in the second mode, or information indicating games handleable in the second mode.

The control unit 44 has the execution unit 441, the information acquisition unit 442, the mode determination unit 443, the handleability determination unit 444, and the display control unit 445.

The execution unit 441 executes a game selected by the user according to operation signals received from the operation device 2A via the information processing device 7.

The information acquisition unit 442 acquires information associated with the game currently executed from the storage unit 42.

The mode determination unit 443 and the handleability determination unit 444 operate in manners similar to the corresponding manners described above.

The display control unit 445 corresponds to a notification unit. The display control unit 445 generates a screen during execution of the game and transmits an image of the generated screen during execution to the information processing device 7. In this manner, the information processing device 7 displays the received image on the display device 6 to present a screen during execution such as the screens during execution P1 to P4.

As described above, the information processing device 7 is capable of advancing a game by transmitting operation signals received from the operation device 2A to the server SVB, and displaying a screen during execution received from the server SVB on the display device 6, and also capable of giving a notification of the operation mode of the operation device 2A using a message indicating the operation mode of the operation device 2A.

[Advantageous Effects of Fourth Embodiment] The game system 1B according to the present embodiment described above can offer the following advantageous effects as well as advantageous effects similar to those of the game systems of the first to third embodiments.

For example, the game system 1B equivalent to an operation system includes the operation device 2A transmitting an operation signal, the information processing device 7 receiving the operation signal, and the server SVB communicating with the information processing device. The operation device 2A includes the operation unit 23, the power generation elements 251 each generating power according to an operation performed for the operation unit 23, the battery BT supplying power, and the communication unit 29A functioning as a transmission unit which transmits an operation signal corresponding to the operation unit 23 having been operated. The operation device 2A operates in either one of the first mode where the communication unit 29A transmits an operation signal by use of power supplied from the battery BT, and the second mode where the communication unit 29A transmits an operation signal by use of power generated by the power generation elements 251. The operation signal contains information indicating the operation mode of the operation device 2A.

The information processing device 7 transmits the operation signal received from the operation device 2A to the server SVB. The information processing device 7 receives, from the server SVB, a screen during execution obtained by the server SVB as a processing result. The information processing device 7 displays the screen during execution on the display device 6, for example.

The server SVB includes the mode determination unit 443, and the display control unit 445 functioning as a notification unit. The mode determination unit 443 determines the operation mode of the operation device 2A on the basis of an operation signal received from the information processing device 7. When the mode determination unit 443 determines that the operation mode of the operation device 2A has been switched from the first mode to the second mode, the display control unit 445 transmits a screen during execution obtained as a processing result which is to be given by the information processing device 7 as a notification of the operation mode of the operation device 2A.

According to this configuration, similarly to the game system 1A, the information processing device 7 gives a notification indicating the operation mode of the operation device 2A on the basis of a processing result received from the server SVB when the operation mode of the operation device 2A is switched to the second mode which may produce a transmission delay of an operation signal from an operation performed by the user. Specifically, the display control unit 445 of the server SVB causes the information processing device 7 to give a notification that the operation mode of the operation device 2A has been switched to the second mode. This configuration can notify the user of the fact of switching to the second mode when the operation mode of the operation device 2A is switched to the second mode. Accordingly, usability of the game system 1B as an operation system improves.

The server SVB further includes the execution unit 441 and the handleability determination unit 444. The execution unit 441 executes a game according to operation signals transmitted from the operation device 2A and received by the information processing device 7. When the mode determination unit 443 determines that the operation mode of the operation device 2A is the second mode, the handleability determination unit 444 determines whether or not the game currently executed is handleable in the second mode. When the handleability determination unit 444 determines that the game currently executed is not handleable in the second mode, the display control unit 445 functioning as a notification unit transmits, to the information processing device 7, a screen during execution obtained as a processing result which is to be given by the information processing device 7 as a notification that the game is not handleable in the second mode.

According to this configuration, the game device 4 can notify the user of the fact that the game currently executed is not handleable in the second mode when the operation mode of the operation device 2A is switched to the second mode. Accordingly, usability of the game system 1B further improves.

Note that the game system 1B includes the operation device 2A as an operation device, and that the server SVB has a function similar to the function of the game device 4 presented in the first embodiment. However, the game system 1B is not limited to this. The game system 1B may include the operation device 2B or the operation device 2C as an operation device, while the server SVB may have a configuration similar to the configuration of the game device 4 presented in the second or third embodiment. In this case, the operation device 2B or 2C is only required to be connected to the information processing device 7 by wired or wireless connection.

[Modifications of Embodiments] The present disclosure includes not only the respective embodiments described above, but also modifications, improvements, and the like made within a range where the object of the present disclosure is achievable.

According to the present embodiments described above, each of the operations 2A, 2B, and 2C automatically switches the operation mode to the second mode when the residual quantity of the battery BT becomes smaller than the predetermined residual quantity. However, this example is not required to be adopted. For example, each of the operations 2B and 2C may be configured to switch the operation mode only by using the switching unit 32 and the mode switching unit 314.

According to the third and fourth embodiments described above, the operation device 2C can switch the operation mode according to an operation by the user using the switching unit 32 and the mode switching unit 314. However, this example is not required to be adopted. The operation device 2C may achieve switching of the operation mode only on the basis of a level of power received by the power reception unit 34. In other words, the operation device 2C may be a device having only the third function of the first to third functions described above.

According to the first, second, and fourth embodiments described above, each of the operation devices 2A and 2B includes the charging unit 26, the notification unit 27, and the vibration unit 28. However, this example is not required to be adopted. Each of the operation devices 2A and 2B may eliminate at least any one of the charging unit 26, the notification unit 27, and the vibration unit 28.

According to the third and fourth embodiments described above, the operation device 2C includes the notification unit 27 and the vibration unit 28. However, this example is not required to be adopted. The operation device 2C may eliminate at least either one of the notification unit 27 and the vibration unit 28.

According to the respective embodiments described above, an operation signal contains information indicating that this operation signal is an operation signal transmitted from the first communication unit 291 by use of power supplied from the battery BT, or information indicating that this operation signal is an operation signal transmitted from the second communication unit 292 by use of power supplied from the power generation elements 251. Accordingly, the operation signal contains information indicating the communication unit corresponding to a transmission source of the operation signal. In other words, the operation signal contains information indicating the operation mode of the operation device 2A, 2B, or 2C. However, this example is not required to be adopted. The operation signal need not contain information indicating the transmission source of the operation signal, and information indicating the operation mode.

According to the respective embodiments described above, in a case where an operation signal is transmitted from the first communication unit 291, the first control units 311 and 311C each having a function of a transmission regulation unit transmit regulation signals to the second control units 312 and 312C, respectively, to regulate transmission of an operation signal from the second communication unit 292. However, this example is not required to be adopted. The game device 4, the information processing device 7, or the server SVB each receiving an operation signal from the operation device 2A, 2B, or 2C may ignore an operation signal received from the second communication unit 292.

According to the second to fourth embodiments described above, the switching unit 32 outputs a switching signal to the control unit 31B by use of power supplied from the battery BT. However, this example is not required to be adopted. The switching unit 32 may have a power generation element and output a switching signal by use of power generated by this power generation element according to an operation performed by the user for the switching unit 32.

According to the respective embodiments described above, each of the plurality of detection elements 241, and each of the plurality of power generation elements 251 output identification information associated with a corresponding detection target. However, this example is not required to be adopted. For example, in a case where the detection elements 241 and the power generation elements 251 corresponding to the respective operators constituting the operation unit 23 are individually connected to the control unit 31A, 31B, or 31C, each of the detection elements 241 and the power generation elements 251 need not output identification information associated with the corresponding detection target.

According to the respective embodiments described above, the operation unit 23, the detection unit 24, and the power generation unit 25 have different configurations. However, this example is not required to be adopted. Such a configuration which unifies one of the operators of the operation unit 23, the detection elements 241, and the power generation elements 251 may be adopted.

According to the third and fourth embodiment described above, the power reception unit 34 includes the wireless power reception unit 341 and the wired power reception unit 342. However, this example is not required to be adopted. The power reception unit 34 is only required to have at least either one of the wireless power reception unit 341 and the wired power reception unit 342.

According to the first to third embodiments described above, the electronic device corresponding to the operation target of the operation device 2A, 2B, or 2C is the game device 4. According to the fourth embodiment described above, the electronic device corresponding to the operation target of the operation device 2A, 2B, or 2C is the server SVB communicable with the information processing device 7. However, this example is not required to be adopted. The electronic device corresponding to the operation target operated by the operation device of the present disclosure may be an electronic device other than a game device, such as a television and AV (audiovisual) equipment.

Moreover, according to the fourth embodiment, the information processing device 7 is not necessarily required to display a screen during execution, which is a processing result obtained by the server SVB, on the display device 6. The information processing device 7 is only required to give a notification of the operation mode of the operation device 2A, 2B, or 2C.

According to the first to third embodiments described above, the handleability determination unit 444 of the game device 4 determines whether or not the game currently executed is handleable in the second mode of the operation device 2A, 2B, or 2C on the basis of information acquired from the server SVA. Moreover, according to the fourth embodiment described above, the handleability determination unit 444 of the server SVB determines whether or not the game currently executed is handleable in the second mode of the operation device 2A, 2B, or 2C on the basis of information acquired from the storage unit 42. However, this example is not required to be adopted. The handleability determination unit 444 may determine whether or not the game currently executed is handleable in the second mode on the basis of other information.

Moreover, this information associated with the game may be stored in the storage unit 42 of the game device 4 beforehand or may be acquired from an external device other than the servers SVA and SVB. Further, the information associated with the game may be contained in a game program.

According to the respective embodiments described above, the operation unit 23 includes the touch pad 235 and the sticks 236. However, this example is not required to be adopted. At least either one of the touch pad 235 and the sticks 236 may be eliminated from the operation unit 23.

Moreover, the operation unit 23 includes the one direction button 231, the four buttons 232, the two buttons 233, and the four buttons 234. However, this example is not required to be adopted. The operation unit 23 is only required to have at least one operator.

Further, the operation devices 2A, 2B, and 2C each having the layout depicted in FIG. 2 by way of example have been presented as the operation device of the present disclosure. However, this example is not required to be adopted. The operation device of the present disclosure is not limited to the operation devices 2A, 2B, and 2C each having the layout described above, but may be an operation device having a layout adoptable as a remote controller of a television or the like, for example. Accordingly, the operation device of the present disclosure is not limited to a game controller.

According to the respective embodiments described above, the handleability determination unit 444 determines whether or not the game currently executed is handleable in the second mode. However, this example is not required to be adopted. For example, in a case where the user selects a game to be executed on a game selection screen or the like, a notification unit may give a notification indicating a determination result obtained by determining whether or not the selected game is handleable in the second mode.

In addition, the handleability determination unit 444 may be eliminated. In this case, when the mode determination unit 443 determines that the operation mode of the operation device has been switched from the first mode to the second mode, the notification unit such as the display control unit 445 may give a notification indicating the operation mode of the operation device by use of the display device 6, the information processing device 7, or the like.

[Summary of Present Disclosure] A summary of the present disclosure will hereinafter be additionally noted.

An operation device according to a first aspect of the present disclosure includes an operation unit, a power generation element that generates power according to an operation of the operation unit, a battery that supplies power, and a communication unit that transmits an operation signal corresponding to the operation unit that has been operated, in which the communication unit transmits the operation signal by use of power supplied from the battery, in a case where a residual quantity of the battery is a predetermined residual quantity or larger, and the communication unit transmits the operation signal by use of power generated by the power generation element, in a case where the residual quantity of the battery is smaller than the predetermined residual quantity.

This configuration achieves transmission of an operation signal by use of power supplied from the battery, in a case where the residual quantity of the battery is the predetermined residual quantity or larger. Accordingly, transmission of an operation signal is achievable without delay. On the other hand, in a case where the residual quantity of the battery is smaller than the predetermined residual quantity, a transmission delay of an operation signal may be produced. However, the operation device does not become disabled. Accordingly, usability of the operation device improves.

An operation device according to a second aspect of the present disclosure includes an operation unit, a power generation element that generates power according to an operation of the operation unit, a battery that supplies power, a switching unit that switches an operation mode according to an operation performed by a user, and a communication unit that transmits an operation signal corresponding to the operation unit that has been operated, in which the communication unit transmits the operation signal by use of power accumulated in the battery, in a case where the operation mode is a first mode, and the communication unit transmits the operation signal by use of power generated by the power generation element, in a case where the operation mode is a second mode.

According to this configuration, the user is allowed to select the desired operation mode from the first mode which consumes power accumulated in the battery but achieves transmission of an operation signal without delay, and the second mode which may produce a delay but preserves power accumulated in the battery. In this manner, even in a case where a certain residual quantity remains in the battery, for example, this residual quantity can be preserved in the battery by switching to the second mode. Accordingly, replacement of the battery and the frequency of charging can be both reduced. As a result, usability of the operation device improves.

In the second aspect described above, there may be further provided a mode switching unit that switches the operation mode to either one of the first mode and the second mode according to a switching signal input from the switching unit, and the switching unit may output the switching signal by use of power supplied from the battery.

According to this configuration, the switching unit is unable to output a switching signal unless power sufficient for outputting a switching signal from the switching unit remains in the battery. Accordingly, in a case where only a small residual quantity remains in the battery, the operation mode of the operation device cannot switch to the first mode of the first and second modes, as the mode for transmitting an operation signal by use of power supplied from the battery. In this manner, regulation of switching to the first mode is achievable according to the residual quantity of the battery. As a result, usability of the operation device further improves.

An operation device according to a third aspect of the present disclosure include an operation unit, a power generation element that generates power according to an operation of the operation unit, a battery that supplies power, a power reception unit that receives power externally supplied, and a communication unit that transmits an operation signal corresponding to the operation unit that has been operated. In a case where power received by the power reception unit has a predetermined value or higher, the communication unit transmits the operation signal by use of the power supplied from the battery charged by power received by the power reception unit, and in a case where the power received by the power reception unit has a value lower than the predetermined value, the communication unit transmits the operation signal by use of the power generated by the power generation element.

This configuration achieves transmission of an operation signal by use of power generated by the power generation element in a case where received power is not sufficiently high, e.g., in a case where power lower than power sufficient for transmitting an operation signal is received, even when power is supplied from the outside. Therefore, even in the case of supply of power from the outside, the operation signal transmission state is switchable according to the power supplied from the outside. Accordingly, usability of the operation device improves.

In the first to third aspects described above, there may be further provided a notification unit that gives a notification of an operation state of the operation device by presenting a lighting state. The notification unit may light to give a notification that the communication unit transmits the operation signal by use of the power supplied from the battery, and the notification unit may not light to give a notification that the communication unit transmits the operation signal by use of the power generated by the power generation element.

This configuration allows the user to check whether the operation signal has been transmitted by use of power of the battery, or the operation signal has been transmitted by use of power generated by the power generation element on the basis of the lighting state of the notification unit. Accordingly, usability of the operation device further improves.

In the first to third aspects described above, there may be further provided a notification unit that gives a notification of an operation state of the operation device by presenting a lighting state, and the notification unit may light in a first color to give a notification that the communication unit transmits the operation signal by use of the power supplied from the battery, and the notification unit may light in a second color different from the first color to give a notification that the communication unit transmits the operation signal by use of the power generated by the power generation element.

This configuration can offer advantageous effects similar to those of the configuration including the notification unit which gives the notification of the operation state of the operation device by lighting or not lighting.

In the first to third aspects described above, the communication unit may include a first communication unit that transmits the operation signal by use of the power supplied from the battery, and a second communication unit that transmits the operation signal by use of the power generated by the power generation element, and the operation signal may contain information indicating whether the operation signal has been transmitted by use of the power supplied from the battery, or the operation signal has been transmitted by use of the power supplied from the power generation element.

Note that the operation signal may contain information indicating whether the operation signal has been transmitted from the first communication unit, or transmitted from the second communication unit, as the information indicating whether the operation signal has been transmitted by use of the power supplied from the battery, or the operation signal has been transmitted by use of the power supplied from the power generation element.

According to this configuration, the state of the operation device is recognizable on the basis of the operation signal received by a reception device which receives the operation signal from the operation device.

In the first to third aspects described above, there may be further provided a transmission regulation unit that regulates transmission of the operation signal from the second communication unit in a case where the first communication unit transmits the operation signal.

This configuration can prevent transmission of an operation signal from each of the first communication unit and the second communication unit in response to an operation performed for the same operation unit.

In the first to third aspects described above, there may be further provided a charging unit that charges the battery by use of the power generated by the power generation element.

This configuration allows charging of the battery while using the operation device. Accordingly, usability of the operation device further improves.

In the first to third aspects described above, there may be further provided a vibration unit that generates vibration at a time of transmission of the operation signal.

This configuration can notify the user of the fact that an operation signal has been transmitted in response to an operation. Accordingly, usability of the operation device further improves.

In the first to third aspects described above, there may be further provided a housing, and a touch pad provided in such a manner as to be able to be inserted and protruded into the housing, and the operation unit may include the touch pad.

This configuration achieves transmission of the operation signal by an operation of the touch pad in a manner of a button. Accordingly, general versatility of the operation device improves.

An operation system according to a fourth aspect of the present disclosure includes an operation device that transmits an operation signal, and an electronic device that receives the operation signal and operates, and the operation device includes an operation unit, a power generation element that generates power according to an operation of the operation unit, a battery that supplies power, and a transmission unit that transmits the operation signal corresponding to the operation unit that has been operated. The operation device operates in either one of a first mode where the transmission unit transmits the operation signal by use of power supplied from the battery and a second mode where the transmission unit transmits the operation signal by use of power generated by the power generation element. The operation signal contains information indicating an operation mode of the operation device, and the electronic device includes a reception unit that receives the operation signal from the operation device, a mode determination unit that determines the operation mode of the operation device on the basis of the operation signal received by the reception unit, and a notification unit that gives a notification indicating the operation mode of the operation device, when the mode determination unit determines that the operation mode of the operation device has been switched from the first mode to the second mode.

According to this configuration, the electronic device gives a notification indicating the operation mode of the operation device using the notification unit when the operation mode of the operation device is switched to the second mode which may produce a transmission delay of an operation signal from the time of the operation performed by the user. In other words, the notification unit gives a notification that the operation mode of the operation device has been switched to the second mode. This configuration can notify the user of switching to the second mode when the operation mode of the operation device is switched to the second mode without intention of the user, for example. Accordingly, usability of the operation system improves.

In the fourth aspect described above, the electronic device may be a game device that executes a game. The game device may include a handleability determination unit that determines whether or not the game is handleable in the second mode, when the mode determination unit determines that the operation mode is the second mode, and the notification unit may give a notification that the game is not handleable in the second mode, when the handleability determination unit determines that the game is not handleable in the second mode.

According to this configuration, the game device as the electronic device can notify the user of the fact that the game currently executed is not handleable in the second mode when the operation mode of the operation device is switched to the second mode. Accordingly, usability of the operation system constituted by the game system further improves.

An operation system according to a fifth aspect of the present disclosure includes an operation device that transmits an operation signal, an information processing device that receives the operation signal, and a server that communicates with the information processing device. The operation device includes an operation unit, a power generation element that generates power according to an operation of the operation unit, a battery that supplies power, and a transmission unit that transmits the operation signal corresponding to the operation unit that has been operated. The operation device operates in either one of a first mode where the transmission unit transmits the operation signal by use of power supplied from the battery and a second mode where the transmission unit transmits the operation signal by use of power generated by the power generation element. The operation signal contains information indicating an operation mode of the operation device. The information processing device transmits the operation signal received from the operation device to the server, and receives a processing result obtained by the server from the server. The server includes a mode determination unit that determines the operation mode of the operation device on the basis of the operation signal received from the information processing device, and a notification unit that transmits, to the information processing device, the processing result to be given by the information processing device as a notification indicating the operation mode of the operation device, when the mode determination unit determines that the operation mode of the operation device has been switched from the first mode to the second mode.

According to this configuration, similarly to the operation system of the fourth aspect, the information processing device gives a notification indicating the operation mode of the operation device on the basis of a processing result received from the server when the operation mode of the operation device is switched to the second mode which may produce a transmission delay of an operation signal from an operation performed by the user. Specifically, the notification unit of the server causes the information processing device to give a notification that the operation mode of the operation device has been switched to the second mode. This configuration can notify the user of the fact of switching to the second mode when the operation mode of the operation device is switched to the second mode without intention of the user, for example. Accordingly, usability of the operation system improves.

In the fifth aspect described above, the server may include an execution unit that executes a game according to the operation signal received from the information processing device, and a handleability determination unit that determines whether or not the game is handleable in the second mode, when the mode determination unit determines that the operation mode is the second mode. The notification unit may transmit, to the information processing device, the processing result to be given by the information processing device as a notification that the game is not handleable in the second mode, when the handleability determination unit determines that the game is not handleable in the second mode.

According to this configuration, the information processing device can notify the user of the fact that the game currently executed is not handleable in the second mode when the operation mode of the operation device is switched to the second mode. Accordingly, usability of the operation system further improves.

In the fourth and fifth aspects described above, the handleability determination unit may determine that the game is not handleable in the second mode, in a case where a category of the game to be executed is a predetermined category.

Note herein that a simulation game or a command selective system role playing game can advance a game even if a period from an operation by a user to transmission of an operation signal is relatively long. Accordingly, games in these categories are allowed to proceed even with long latency. On the other hand, games such as a shooting game and an action game are difficult to advance if transmission of an operation signal is delayed from an operation by a user. Accordingly, games in these categories may cause a problem in progress of the games if latency is long.

However, in a case where the game currently executed is not handleable in the second mode and the operation mode of the operation device is switched to the second mode, the configuration described above gives a notification of this fact. Accordingly, the user is easily urged to carry out operations such as charging of the battery.

In the fourth and fifth aspects described above, the handleability determination unit may determine whether or not the game is handleable in the second mode, on the basis of information associated with the game.

The configuration described above can determine whether or not the game currently executed is handleable in the second mode on the basis of the information associated with the game.

REFERENCE SIGNS LIST 1A, 1B: Game system (operation system)
2A, 2B, 2C: Operation device
23: Operation unit
231 to 234: Button
235: Touch pad
236: Stick
24: Detection unit
241: Detection element
25: Power generation unit
251: Power generation element
26: Charging unit
27: Notification unit
28: Vibration unit
29, 29C: Communication unit (transmission unit)
291: First communication unit
292: Second communication unit
293: Wired communication unit
30: Storage unit
31A, 31B, 31C: Control unit
311, 311C: First control unit
312, 312C: Second control unit
313, 313C: Charging control unit
314, 314C: Mode switching unit
32: Switching unit
33: Connection unit
33: Power reception unit
341: Wireless power reception unit
342: Wired power reception unit
4: Game device (electronic device)
41: Communication unit (reception unit)
42: Storage unit
43: Memory
44: Control unit
441: Execution unit
442: Information acquisition unit
443: Mode determination unit
444: Handleability determination unit
445: Display control unit (notification unit)
6: Display device
7: Information processing device
BT: Battery
SVA: Server (external device)
SVB: Server

The invention claimed is:
1. An operation device comprising:
an operation unit;

a power generation element that generates power according to an operation of the operation unit;
a battery that supplies power; and
a communication unit that transmits an operation signal corresponding to the operation unit that has been operated, wherein
the communication unit transmits the operation signal by use of power supplied from the battery, in a case where a residual quantity of the battery is a predetermined residual quantity or larger, and
the communication unit transmits the operation signal by use of power generated by the power generation element, in a case where the residual quantity of the battery is smaller than the predetermined residual quantity, wherein the communication unit includes:
a first communication unit that transmits the operation signal by use of the power supplied from the battery, and
a second communication unit that transmits the operation signal by use of the power generated by the power generation element, and
the operation signal contains information indicating whether the operation signal has been transmitted by use of the power supplied from the battery, or the operation signal has been transmitted by use of the power supplied from the power generation element.

2. The operation device according to claim 1, further comprising:
a notification unit that gives a notification of an operation state of the operation device by presenting a lighting state, wherein
the notification unit lights to give a notification that the communication unit transmits the operation signal by use of the power supplied from the battery, and
the notification unit does not light to give a notification that the communication unit transmits the operation signal by use of the power generated by the power generation element.

3. The operation device according to claim 1, further comprising:
a notification unit that gives a notification of an operation state of the operation device by presenting a lighting state, wherein
the notification unit lights in a first color to give a notification that the communication unit transmits the operation signal by use of the power supplied from the battery, and
the notification unit lights in a second color different from the first color to give a notification that the communication unit transmits the operation signal by use of the power generated by the power generation element.

4. The operation device according to claim 1, further comprising: a transmission regulation unit that regulates transmission of the operation signal from the second communication unit in a case where the first communication unit transmits the operation signal.

5. The operation device according to claim 1, further comprising: a charging unit that charges the battery by use of the power generated by the power generation element.

6. The operation device according to claim 1, further comprising:
a vibration unit that generates vibration at a time of transmission of the operation signal.

7. The operation device according to claim 1, further comprising:
a housing; and
a touch pad provided in such a manner as to be able to be inserted and protruded into the housing, wherein
the operation unit includes the touch pad.

8. An operation device comprising:
an operation unit;
a power generation element that generates power according to an operation of the operation unit;
a battery that supplies power;
a switching unit that switches an operation mode according to an operation performed by a user; and
a communication unit that transmits an operation signal corresponding to the operation unit that has been operated, wherein
the communication unit transmits the operation signal by use of power accumulated in the battery, in a case where the operation mode is a first mode, and
the communication unit transmits the operation signal by use of power generated by the power generation element, in a case where the operation mode is a second mode, wherein the communication unit includes:
a first communication unit that transmits the operation signal by use of the power supplied from the battery, and
a second communication unit that transmits the operation signal by use of the power generated by the power generation element, and
the operation signal contains information indicating whether the operation signal has been transmitted by use of the power supplied from the battery, or the operation signal has been transmitted by use of the power supplied from the power generation element.

9. The operation device according to claim 8, further comprising:
a mode switching unit that switches the operation mode to either one of the first mode and the second mode according to a switching signal input from the switching unit, wherein the switching unit outputs the switching signal by use of power supplied from the battery.

10. An operation device comprising:
an operation unit;
a power generation element that generates power according to an operation of the operation unit;
a battery that supplies power;
a power reception unit that receives power externally supplied; and
a communication unit that transmits an operation signal corresponding to the operation unit that has been operated, wherein,
in a case where power received by the power reception unit has a predetermined value or higher, the communication unit transmits the operation signal by use of the power supplied from the battery charged by power received by the power reception unit, and
in a case where the power received by the power reception unit has a value lower than the predetermined value, the communication unit transmits the operation signal by use of the power generated by the power generation element, wherein the communication unit includes:
a first communication unit that transmits the operation signal by use of the power supplied from the battery, and
a second communication unit that transmits the operation signal by use of the power generated by the power generation element, and
the operation signal contains information indicating whether the operation signal has been transmitted by use of the power supplied from the battery, or the operation signal has been transmitted by use of the power supplied from the power generation element.

11. An operation system comprising:
an operation device that transmits an operation signal; and
an electronic device that receives the operation signal and operates, wherein
the operation device includes
an operation unit,
a power generation element that generates power according to an operation of the operation unit,
a battery that supplies power, and
a transmission unit that transmits the operation signal corresponding to the operation unit that has been operated,
the operation device operates in either one of a first mode where the transmission unit transmits the operation signal by use of power supplied from the battery and a second mode where the transmission unit transmits the operation signal by use of power generated by the power generation element,
the operation signal contains information indicating an operation mode of the operation device, and
the electronic device includes
a reception unit that receives the operation signal from the operation device,
a mode determination unit that determines the operation mode of the operation device on a basis of the operation signal received by the reception unit, and
a notification unit that gives a notification indicating the operation mode of the operation device, when the mode determination unit determines that the operation mode of the operation device has been switched from the first mode to the second mode.

12. The operation system according to claim 11, wherein the electronic device is a game device that executes a game,
the game device includes a handleability determination unit that determines whether or not the game is handleable in the second mode, when the mode determination unit determines that the operation mode is the second mode, and
the notification unit gives a notification that the game is not handleable in the second mode, when the handleability determination unit determines that the game is not handleable in the second mode.

13. The operation system according to claim 12, wherein the handleability determination unit determines that the game is not handleable in the second mode, in a case where a category of the game to be executed is a predetermined category.

14. The operation device according to claim 12, wherein the handleability determination unit determines whether or not the game is handleable in the second mode, on a basis of information associated with the game.

15. An operation system comprising:
an operation device that transmits an operation signal;
an information processing device that receives the operation signal; and
a server that communicates with the information processing device, wherein
the operation device includes
an operation unit,
a power generation element that generates power according to an operation of the operation unit,
a battery that supplies power, and
a transmission unit that transmits the operation signal corresponding to the operation unit that has been operated,
the operation device operates in either one of a first mode where the transmission unit transmits the operation signal by use of power supplied from the battery and a second mode where the transmission unit transmits the operation signal by use of power generated by the power generation element,
the operation signal contains information indicating an operation mode of the operation device,
the information processing device transmits the operation signal received from the operation device to the server, and receives a processing result obtained by the server from the server, and
the server includes
a mode determination unit that determines the operation mode of the operation device on a basis of the operation signal received from the information processing device, and
a notification unit that transmits, to the information processing device, the processing result to be given by the information processing device as a notification indicating the operation mode of the operation device, when the mode determination unit determines that the operation mode of the operation device has been switched from the first mode to the second mode.

16. The operation system according to claim 15, wherein the server includes
an execution unit that executes a game according to the operation signal received from the information processing device, and
a handleability determination unit that determines whether or not the game is handleable in the second mode, when the mode determination unit determines that the operation mode is the second mode, and
the notification unit transmits, to the information processing device, the processing result to be given by the information processing device as a notification that the game is not handleable in the second mode, when the handleability determination unit determines that the game is not handleable in the second mode.

* * * * *